US012617680B2

(12) United States Patent
DeBlock et al.

(10) Patent No.: US 12,617,680 B2
(45) Date of Patent: May 5, 2026

(54) SYNTHESIS OF LITHIUM-RICH IRON SULFIDES BY CHEMICAL LITHATION

(71) Applicant: The Government of the United States of America, as represented by the Secretary of the Navy, Arlington, VA (US)

(72) Inventors: Ryan H. DeBlock, Alexandria, VA (US); Jeffrey W. Long, Alexandria, VA (US); Hunter O. Ford, Falls Church, VA (US); Debra R. Rolison, Arlington, VA (US); Brian L. Chaloux, Alexandria, VA (US)

(73) Assignee: The Government of the United States of America, as represented by the Secretary of the Navy, Arlington, VA (US)

(*) Notice: Subject to any disclaimer, the term of this patent is extended or adjusted under 35 U.S.C. 154(b) by 0 days.

(21) Appl. No.: 19/350,397

(22) Filed: Oct. 6, 2025

(65) Prior Publication Data

US 2026/0097957 A1 Apr. 9, 2026

Related U.S. Application Data

(60) Provisional application No. 63/703,264, filed on Oct. 4, 2024.

(51) Int. Cl.
*C01B 17/24* (2006.01)

(52) U.S. Cl.
CPC .......... *C01B 17/24* (2013.01); *C01P 2002/72* (2013.01); *C01P 2002/82* (2013.01);
(Continued)

(58) Field of Classification Search
CPC ...................................................... C01B 17/24
See application file for complete search history.

(56) References Cited

U.S. PATENT DOCUMENTS

| | | | | |
|---|---|---|---|---|
| 7,018,603 B2 * | 3/2006 | Ritchie | C01G 39/06 423/511 |
| 9,583,779 B2 | 2/2017 | Chiang et al. | |

FOREIGN PATENT DOCUMENTS

| | | | | | |
|---|---|---|---|---|---|
| CA | 2700912 A1 | | 3/2009 | |
| GB | 2464455 A | | 4/2010 | |
| JP | 2012-505143 A | * | 3/2012 | H01M 4/58 |

OTHER PUBLICATIONS

Deblock et al., Chem. Commun., 2024, 60, 15004-15006.
(Continued)

*Primary Examiner* — Wayne A Langel
(74) *Attorney, Agent, or Firm* — US Naval Research Laboratory; Joseph T. Grunkemeyer

(57) ABSTRACT

Disclosed herein is a method of: providing a polyaromatic hydrocarbon-M adduct solution and reacting the adduct with a sulfide compound having the formula $Ni_xFe_{1-x}S_2$ to form a product having the formula $M_yNi_xFe_{1-x}S_2$. M is lithium or sodium. The value x is at least 0 and less than 1, and y is a positive number of at most 2. Also disclosed herein is a composition comprising $M_yNi_xFe_{1-x}S_2$. The $M_yNi_xFe_{1-x}S_2$ has a particle size of less than 1 μm.

13 Claims, 24 Drawing Sheets

(52) U.S. Cl.
CPC ...... *C01P 2002/85* (2013.01); *C01P 2004/03* (2013.01); *C01P 2004/64* (2013.01); *C01P 2006/40* (2013.01); *C01P 2006/80* (2013.01)

(56) References Cited

OTHER PUBLICATIONS

Deblock et al., "Unveiling anion-coupled redox in Li2FeS2: A wet-chemical approach to high-capacity cathode materials" ACS Fall (Aug. 18, 2025).
Deblock et al., "Chemical Insertion of Li+ Enables Reversible, Anionic Redox in FeS2" ECS Meeting Abstracts (Oct. 6, 2024).
Murphy et al., Science, 1979, 205, 651-656.
Zou et al., ACS Appl. Mater. Interfaces 2020, 12, 44850-44857.
Su et al., Batteries 2022, 8, 99.
Hansen et al., J. American Chemical Society, 2020, 142, 6737-6749.
Barker et al., J. Power Sources, 2011, 196, 6960-6963.
Batchelor et al., Physical Review B: Condensed Matter and Materials Physics, 1988, 37, 3699-3702.
Dugast et al., Solid State Ionics, 1981, 5, 375-378.
Fong et al., J. Electrochemical Society, 1989, 136, 3206-3210.

* cited by examiner

SYNTHESIS OF LITHIUM-RICH IRON SULFIDES BY CHEMICAL LITHATION

REFERENCE TO RELATED APPLICATIONS

This application claims the benefit of U.S. Provisional Application No. 63/703,264, filed on Oct. 4, 2024. The provisional application and all other publications and patent documents referred to throughout this nonprovisional application are incorporated herein by reference.

TECHNICAL FIELD

The present disclosure is generally related to lithium-rich iron sulfides.

DESCRIPTION OF THE RELATED ART

Charge-insertion cathodes utilized in lithium-ion batteries (LIBs) rely on topotactic insertion and deinsertion of $Li^+$ into/from the material concomitant with transition-metal reduction and oxidation, respectively.[1] This insertion reaction is typically limited to a one-electron transfer, determined by the moles of $Li^+$ in the cathode material and the available oxidation states in its transition metal. Recently, a class of lithium-rich oxides (e.g., $Li_2RuO_3$ and $Li_2MnO_3$) has demonstrated both cationic (metal-based) and anionic (oxygen-based) redox upon lithium insertion that can effectively double the capacity for a given material.[2,3] Research on the anion-redox mechanism predominantly focuses on characterizing and optimizing oxide-based materials. Due to the high voltages at which oxide-based anion redox is active, charge-storage processes may compete with undesirable reactions such as electrolyte degradation and irreversible evolution of $CO_2$, CO, and $O_2$.[4,5]

In contrast with Li-rich oxide materials, analogous metal sulfides oxidize at lower and more practical voltages due to the higher energy of their frontier orbitals.[6-8] These alkali-rich chalcogenides present an attractive opportunity to avoid electrolyte breakdown, eliminate unsafe $O_2$ evolution, and provide a more stable electrochemical window in which to operate while still utilizing anionic-redox mechanisms. One promising cathode composition, lithium-rich iron sulfide, $Li_2FeS_2$, stores 1.5 to 2 electrons per formula unit through the combination of cationic and anionic redox, increasing the achievable cathode capacity to nearly 400 mAh $g^{-1}$.[9,10] In contrast, lithium nickel manganese cobalt oxide (NMC) and nickel cobalt aluminum oxide (NCA) cathodes found in state-of-the-art LIBs typically exhibit a capacity of ~200 mAh $g^{-1}$.[11]

The synthesis of lithium-rich iron sulfide and related materials has historically been limited to high-temperature (>880° C.), solid-state methods that typically involve grinding and heating precursor materials (e.g., $FeS_2$, Fe, and $Li_2S$ powders) to their molten state.[9,10,12,13] After cooling back to ambient temperature, the resulting materials are chunky particulates (tens of micrometers) that are difficult to further process into powder-composite electrodes for battery use. This melt-based approach also limits synthetic control for desired compositional variations (e.g., metal-site substitution for Fe in $Li_2FeS_2$) as restricted by the melting points of other available metal precursors.

SUMMARY OF THE INVENTION

Disclosed herein is a method comprising: providing a polyaromatic hydrocarbon-M adduct solution and reacting the adduct with a sulfide compound having the formula $Ni_xFe_{1-x}S_2$ to form a product having the formula $M_yNi_xFe_{1-x}S_2$. M is lithium or sodium. The value x is at least 0 and less than 1, and y is a positive number of at most 2.

Also disclosed herein is a composition comprising $M_yNi_xFe_{1-x}S_2$. M is lithium or sodium. The value x is at least 0 and less than 1, and y is a positive number of at most 2. The $M_yNi_xFe_{1-x}S_2$ has a particle size of less than 1 μm.

BRIEF DESCRIPTION OF DRAWINGS

A more complete appreciation will be readily obtained by reference to the following Description of the Example Embodiments and the accompanying drawings.

(FIG. 4B), $Li_2FeS_2$:c.l. (FIG. 4C), and $Li_2FeS_2$:c.l.800 (FIG. 4D) powders. Scale bar=25 μm.

DETAILED DESCRIPTION

Figure 1:
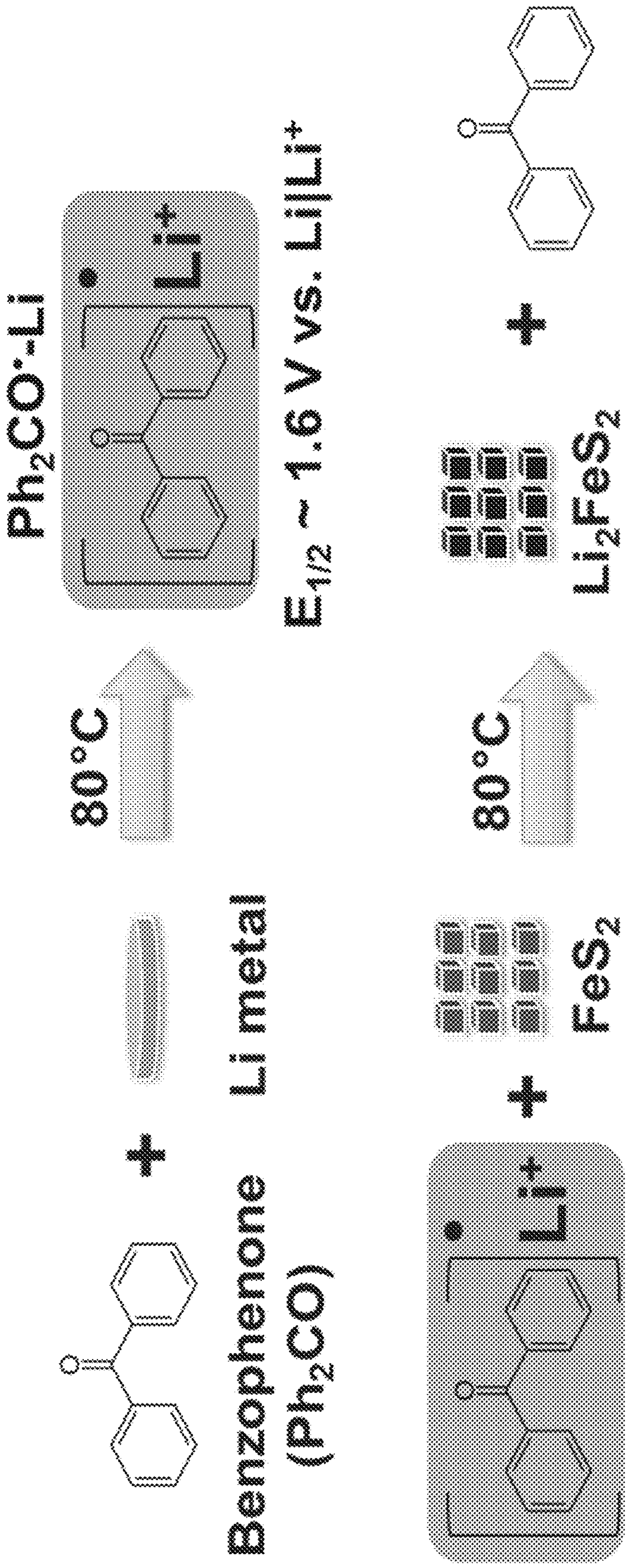
FIG. 1 shows a synthesis schematic of the chemical lithiation of pyrite and its transformation into $Li_2FeS_2$.

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein is the chemical lithiation of iron disulfide ($FeS_2$) as a route to synthesize lithium-rich iron sulfide ($Li_2FeS_2$), an active battery material of interest due to its ability to store lithium cations coupled with solid-state redox reactions at both metal and sulfide/persulfide sites. An alternate synthetic route to $Li_2FeS_2$ based on selective chemical lithiation of pyrite $FeS_2$ is shown. Although $FeS_2$ can form $Li_2FeS_2$ electrochemically, it only does so at suitably low discharge rates and/or high temperatures corresponding to Equations (1) and (2).[14]

$$2\,Li + FeS_2 \longrightarrow Li_2FeS_2 \quad (1)$$

$$2\,Li + Li_2FeS_2 \longrightarrow 2\,Li_2S + Fe \quad (2)$$

Organic redox mediators have been used to lithiate materials,[15] but common chemical lithiation agents such as naphthalenide lithium and biphenyl lithium typically have redox potentials close to that of the $Li/Li^+$ couple (0.4 V and 0.3 V vs $Li/Li^+$, respectively).[16] Under such strongly reducing conditions, $FeS_2$ converts beyond the desired $Li_2FeS_2$ form, decomposing to Fe metal and $Li_2S$.[17] Thus, the redox potential of any proposed lithiating agent must be sufficiently reducing to promote lithiation, but not so powerful that it forms undesirable products.[18,19] For such purposes, benzophenone ($Ph_2CO$) was selected because of the redox potential of its single radical anion form, ~1.6 V vs $Li/Li^+$.[14] Benzophenone is well known for its reaction with sodium metal in the "ketyl still" to dry solvents such as tetrahydrofuran without the need to pull a heavy vacuum.[18] Mechanistically, $Ph_2CO$ readily forms radical anions that associate with lithium or sodium metal to make a stable adduct in solution. These lithium-$Ph_2CO$ complexes exhibit a vibrant blue color in solution and act as a visual indicator for solvent dryness.[19]

In a first step, a polyaromatic hydrocarbon solution is provided. Example polyaromatic hydrocarbons include benzophenone, pyrene, and perylene. One example solvent for the solution is diethylene glycol dimethyl ether. The concentration of polyaromatic hydrocarbon may be any amount that results in subsequent production of metalated iron sulfide ($M_yFeS_2$). (The stoichiometries of the compounds described herein may be approximate.)

In the next step, lithium or sodium metal is added to this solution. This produces, for example, the benzophenone-lithium or -sodium adducts $[(C_6H_5)_2CO]\cdot Li^+$ or $[(C_6H_5)_2CO]\cdot Na^+$. The amount of lithium metal added may be, for example, up to 1 mol or up to 2 mol of lithium metal per 1 mol of benzophenone.

The adduct solution is then reacted with iron sulfide to form $M_yFeS_2$, wherein M is Li or Na, and where x is up to 2. The iron sulfide may be in any physical form, such as a powder. In another embodiment, the iron sulfide is in the form of a coating on a substrate, such as a metal substrate or a carbon substrate, a carbon fiber or a porous carbon paper having iron sulfide deposited within the pores. Such carbon/iron sulfide materials are known in the art. The substrate, with its iron sulfide coating, is added to the adduct solution to form the lithiated product deposited onto the carbon substrate. As used herein, the term "iron sulfide" includes $FeS_2$ where less than all of the iron is substituted with a transition metal such Ni, Co, V, or Mn. The transition metal is retained in the $M_yFeS_2$ product.

The produced $Li_xFeS_2$ may have a particle size, for example, of less than 1 μm or less than 10 nm. In one embodiment, the $Li_xFeS_2$ is a coating on a carbon fiber, and in another it is in the form of iron sulfide deposited within the pores of carbon paper.

Figure 22:
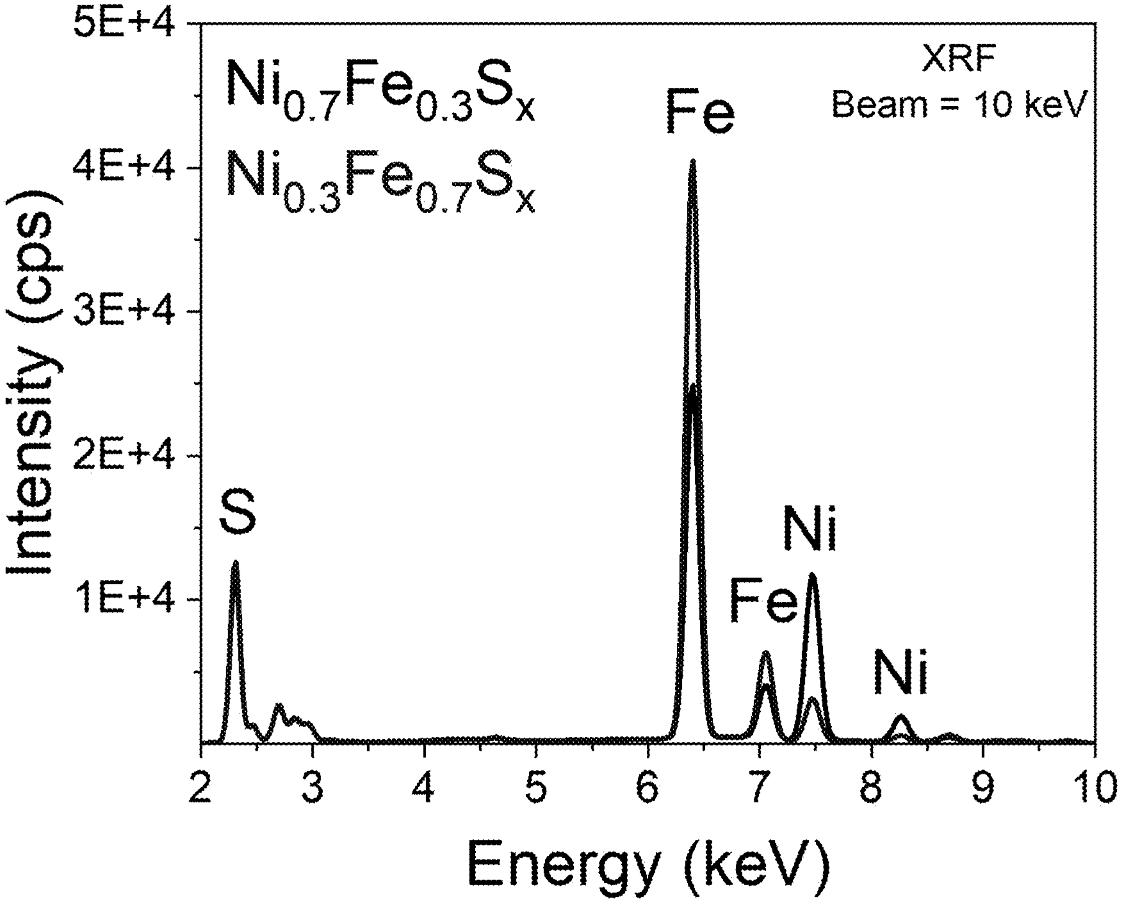
FIG. 22 shows X-ray fluorescence spectra of $Ni_xFe_{1-x}S_2$ compounds, from which empirical chemical formulas are determined.
Figure 23:
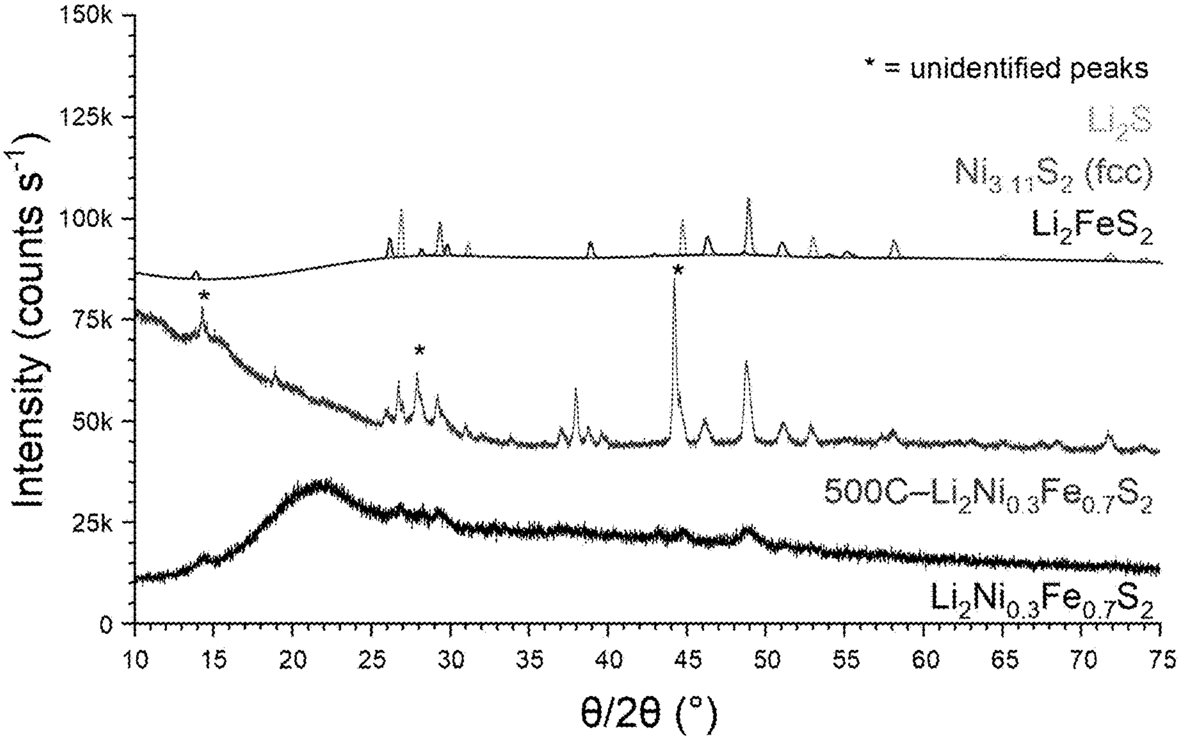
FIG. 23 shows powder X-ray diffractograms of as-synthesized $Li_2Ni_{0.3}Fe_{0.7}S_2$, 500° C. heat-treated $Li_2Ni_{0.3}Fe_{0.7}S_2$, and standards ($Li_2FeS_2$, $Ni_{3.11}S_2$(fcc), $Li_2S$).
Figure 24:
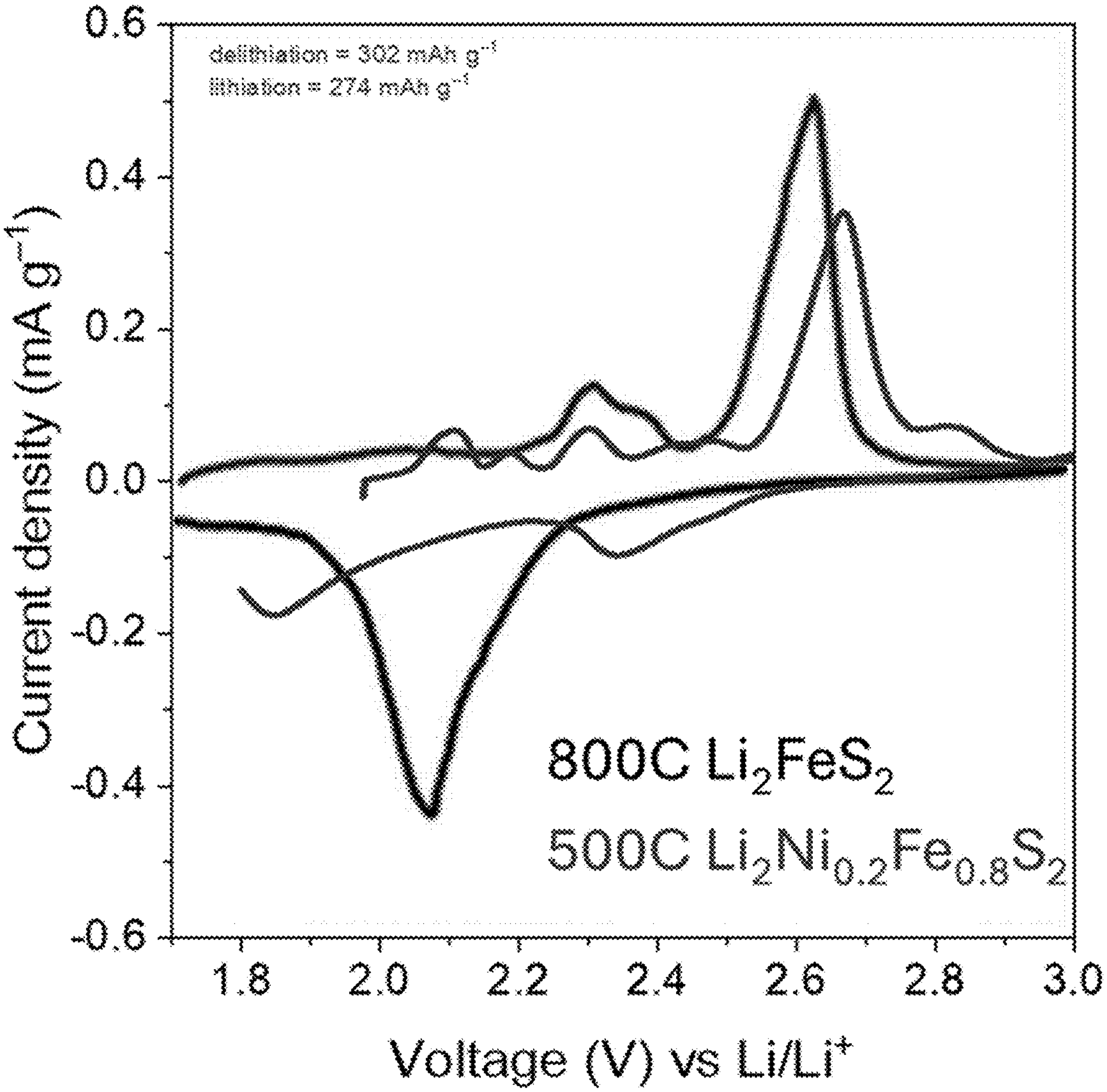
FIG. 24 shows cyclic voltammograms of 800° C. heat-treated $Li_2FeS_2$ and 500° C. heat-treated $Li_2Ni_{0.3}Fe_{0.7}S_2$, where the latter exhibits an increase in oxidation potential for delithiation attributed to Ni substitution. Counter electrode is Li metal, scan rate=0.1 mV $s^{-1}$.

Optionally, the iron sulfide may be substituted with nickel atoms. The formula for such a sulfide compound is $Ni_xFe_{1-x}S_2$, where x is at least 0 and less than 1. This compound may be made by reacting iron(II) sulfate, nickel (II) sulfate, and sodium thiosulfate. The reaction may be a hydrothermal reaction at 180° C. The same processes using benzophenone and lithium or sodium metal may be used to make $M_yNi_xFe_{1-x}S_2$. FIG. 22 shows X-ray fluorescence spectra verifying the production of $Ni_xFe_{1-x}S_2$. FIG. 23 shows powder X-ray diffractograms verifying the production of $Li_2Ni_{0.3}Fe_{0.7}S_2$. FIG. 24 shows cyclic voltammograms demonstrating that $Li_2Ni_{0.3}Fe_{0.7}S_2$ exhibits an increase in oxidation potential for delithiation attributed to Ni substitution.

Figure 2:
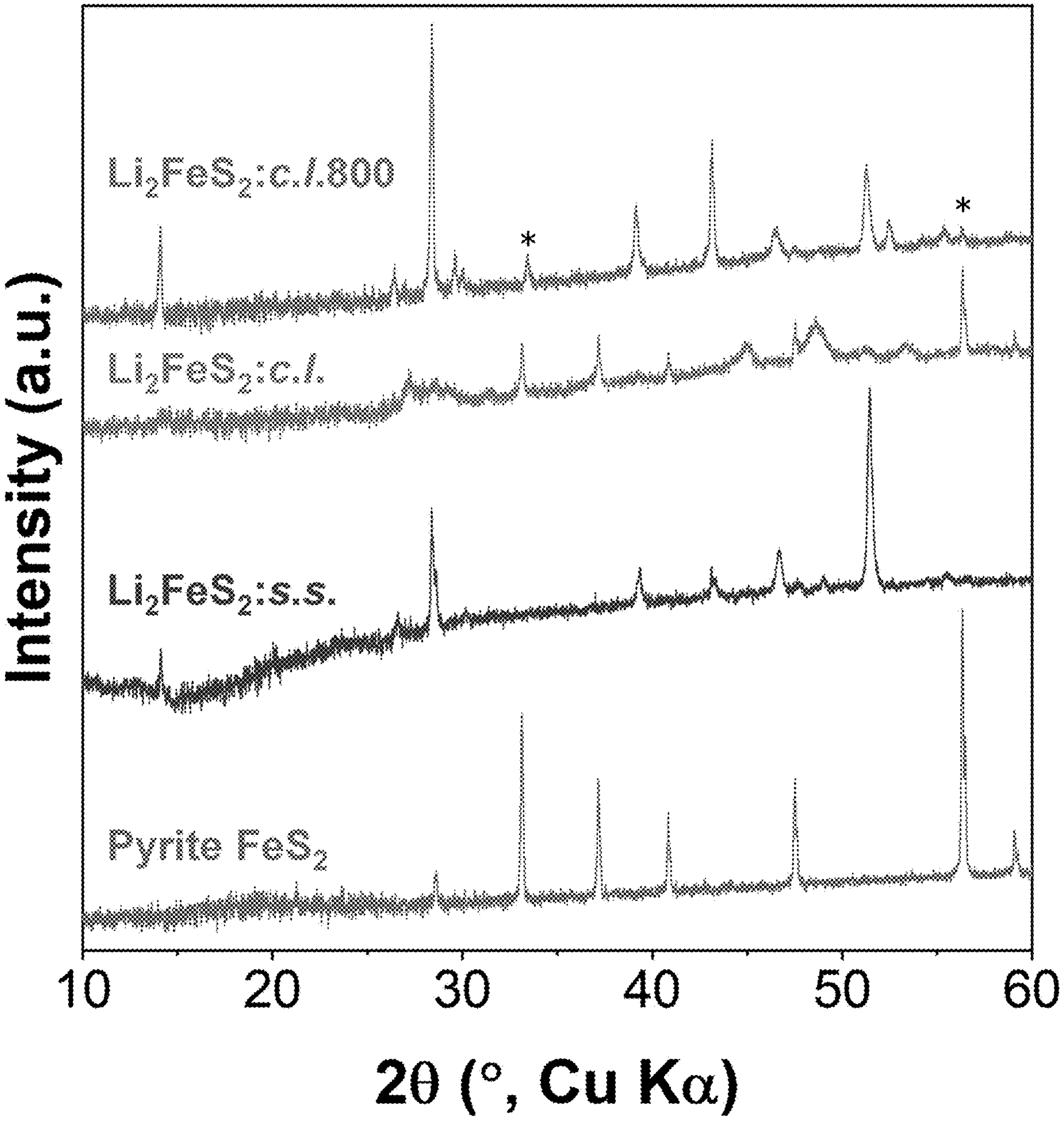
FIG. 2 shows X-ray diffractograms (Cu Kα radiation; λ=1.5406 Å) of pyrite $FeS_2$ precursor, $Li_2FeS_2$:s.s., $Li_2FeS_2$:c.l., and $Li_2FeS_2$:c.l.800.
Figure 3:
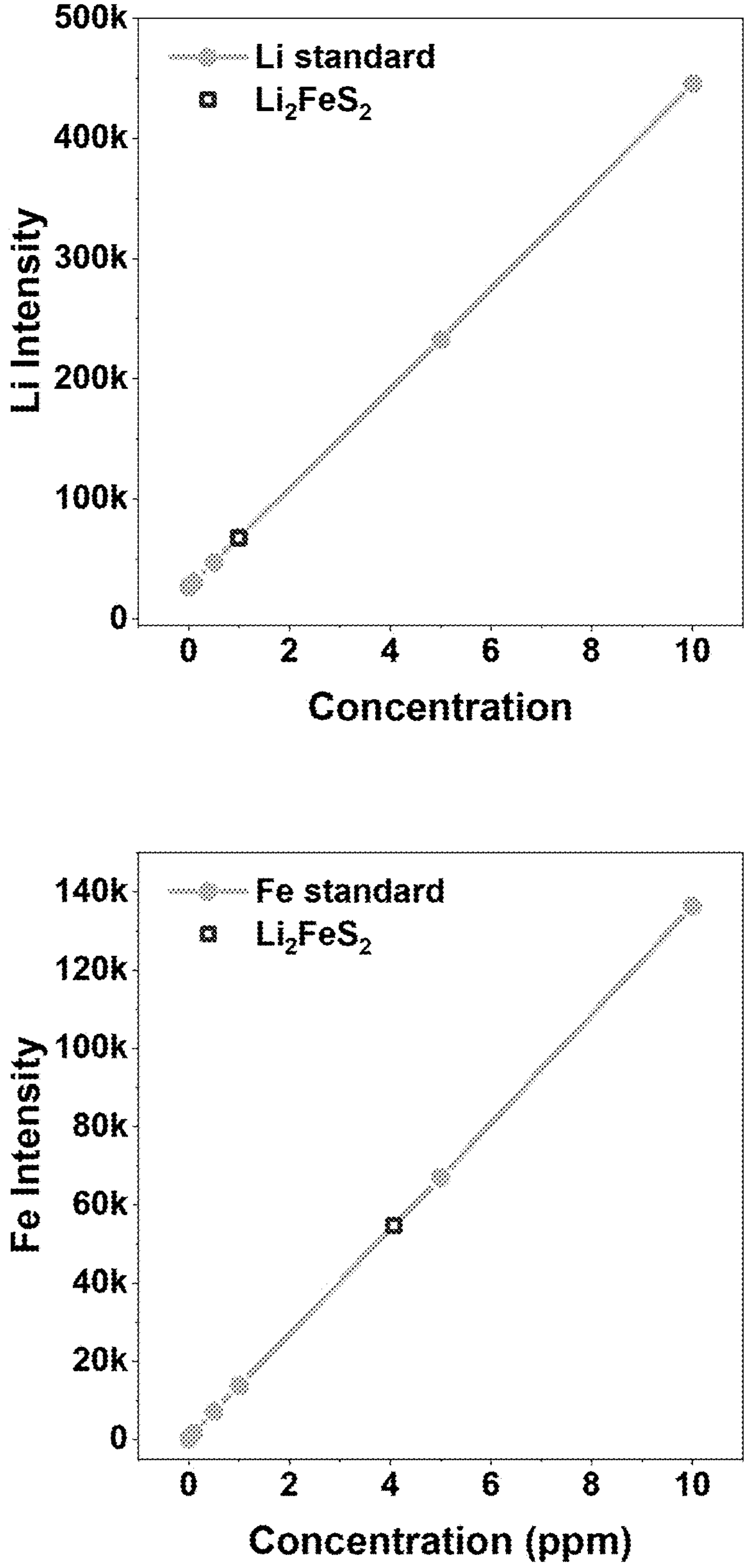
FIG. 3 shows inductively coupled plasma-optical emission spectrometry (ICP-OES) results for chemically lithiated $Li_2FeS_2$. The final composition determined by the elemental assay of the material is $Li_{1.95}FeS_{2.18}$ by assuming that all sulfur is lost to $H_2S$ generation during air exposure and dissolution in nitric acid.
Figure 4A:
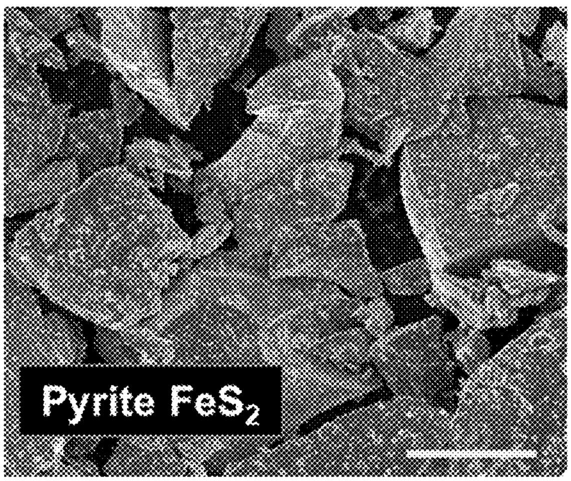
FIGS. 4A-D show scanning electron micrographs of pyrite $FeS_2$ precursor (FIG. 4A), $Li_2FeS_2$:s.s.
Figure 4B:
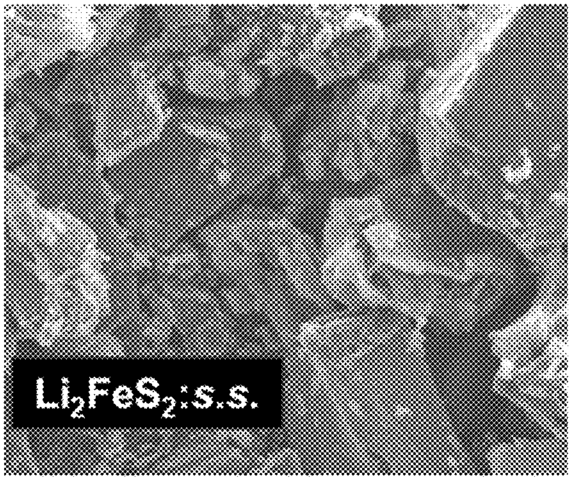
Figure 4C:
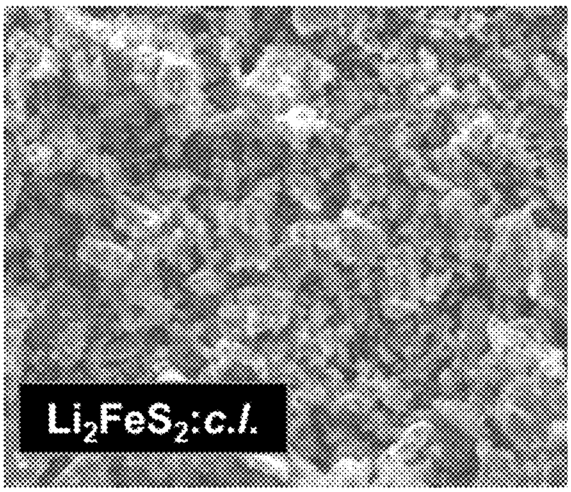
Figure 4D:
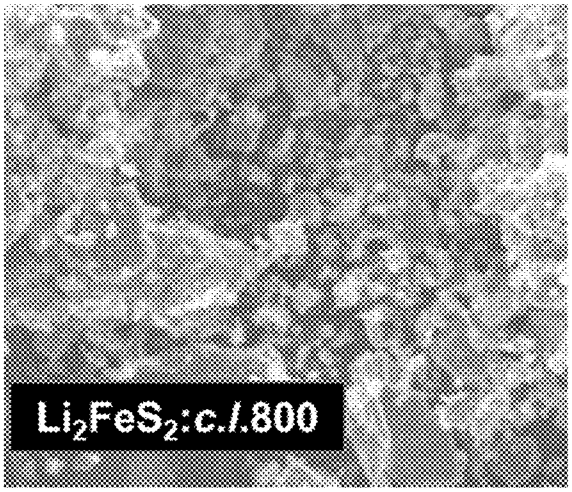

In a typical synthesis (FIG. 1), performed inside of an Ar-filled glovebox, 5.25 mmol of benzophenone is dissolved into 60 mL of diethylene glycol dimethyl ether (diglyme), a solvent that provides a desired balance of boiling point and chemical compatibility. After complete dissolution of the benzophenone, 5.25 mmol of lithium metal is added into solution such that the molar ratio of $Ph_2CO$:Li is 1:1. Excess lithium is avoided in solution because the purple, double radical $Ph_2CO$:Li 1:2 adduct has a lithiating potential of ~0.8 V vs Li/$Li^+$ and will over-reduce the $FeS_2$.[15] This mixture is stirred at 80° C. for 4 h resulting in a deep-blue solution, free of any solids. Next, 2.5 mmol of commercial pyrite iron sulfide is added into the solution and the solution temperature is maintained at 80° C. for 8 h. As the lithium is removed from the $Ph_2CO$:Li adduct, the solution loses its blue color and converts the grey pyrite into a black solid of chemically lithiated, disordered $Li_2FeS_2$ ($Li_2FeS_2$:c.l.), evidenced by X-ray diffraction (FIG. 2) and inductively coupled plasma optical emission spectrometry (FIG. 3). A small amount of residual $FeS_2$ remains in the final product evidenced by the diffraction peaks near 33° and 57° 2θ. The crystallinity of $Li_2FeS_2$:c.l. is improved by heating in a graphite crucible for 16 h at 800° C., below the melting point of $Li_2FeS_2$ (~885° C.).[20] This process is performed entirely within the glovebox due to the severe air and moisture sensitivity of $Li_2FeS_2$. A graphite crucible is chosen to prevent diffusion of lithium into oxide-based crucibles. The resulting powder ($Li_2FeS_2$:c.l.800) exhibits the same $P\bar{3}m1$ crystallographic structure as $Li_2FeS_2$ synthesized via the solid-state route ($Li_2FeS_2$:s.s.),[9] albeit with different crystallographic texturing. To synthesize $Li_2FeS_2$:s.s., 3 mmol of $FeS_2$ (Sigma-Aldrich) and 3 mmol of $Li_2S$ (Sigma-Aldrich) were ground together in a mortar and pestle then pressed into a pellet within an Ar-filled glovebox. The pellet was melted at 900° C. and heated for 16 h in a graphite crucible and cooled naturally.

In contrast with the solid-state synthetic pathway, chemical lithiation of $FeS_2$ produces significantly smaller $Li_2FeS_2$ particles (tens of microns vs hundreds of nanometers), despite the >50 μm size of the commercial $FeS_2$ precursor (FIGS. 4A-D). The chemical lithiation of pyrite imposes significant volume change (cell volume of pyrite $FeS_2$: ~160 $Å^3$; cell volume of $Li_2FeS_2$: ~80 $Å^3$),[12,21] inducing cracking and pulverization resulting in nanoscopic $Li_2FeS_2$. Although the 16 h heat treatment at 800° C. leads to some coarsening, $Li_2FeS_2$:c.l.800 still presents markedly smaller particles than those seen in $Li_2FeS_2$:s.s. Electrochemically active materials benefit significantly from smaller particle sizes by decreasing $Li^+$ diffusion distance and improving contact of active material to electronically conductive carbon powder within the composite electrode structure.[22,23] The See group demonstrates improved energy-storage capacity and cycling performance of melt-prepared $LiNaFeS_2$ through particle size reduction via cryomilling.[26]

Figure 5A:
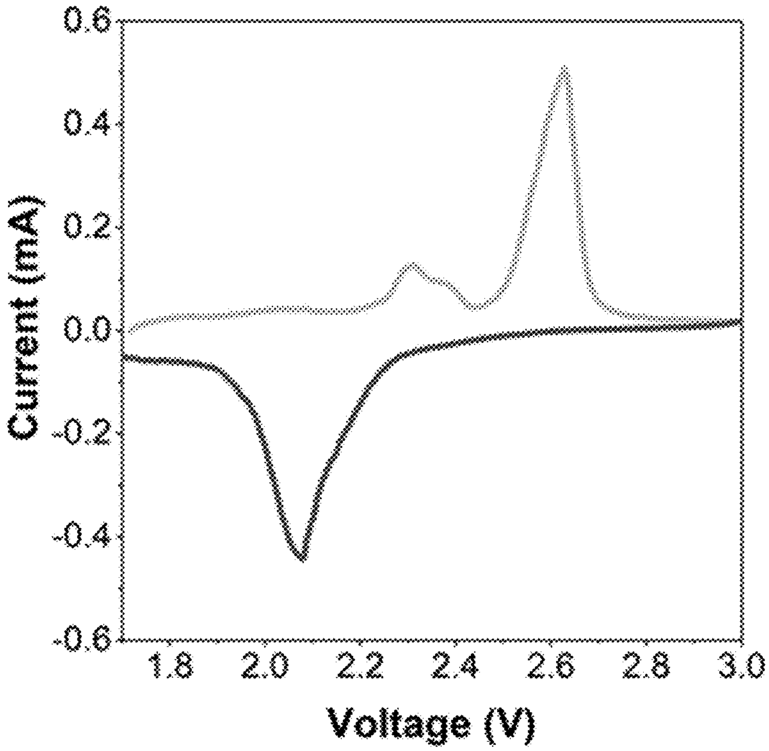
FIGS. 5A-B shows voltammetric sweep (0.1 mV $s^{-1}$) (FIG. 5A) and galvanostatic charge/discharge (20 mA $g^{-1}$) (FIG. 5B) of $Li_2FeS_2$:c.l.800 between 1.8-3.0 V in a half-cell configuration.
Figure 5B:
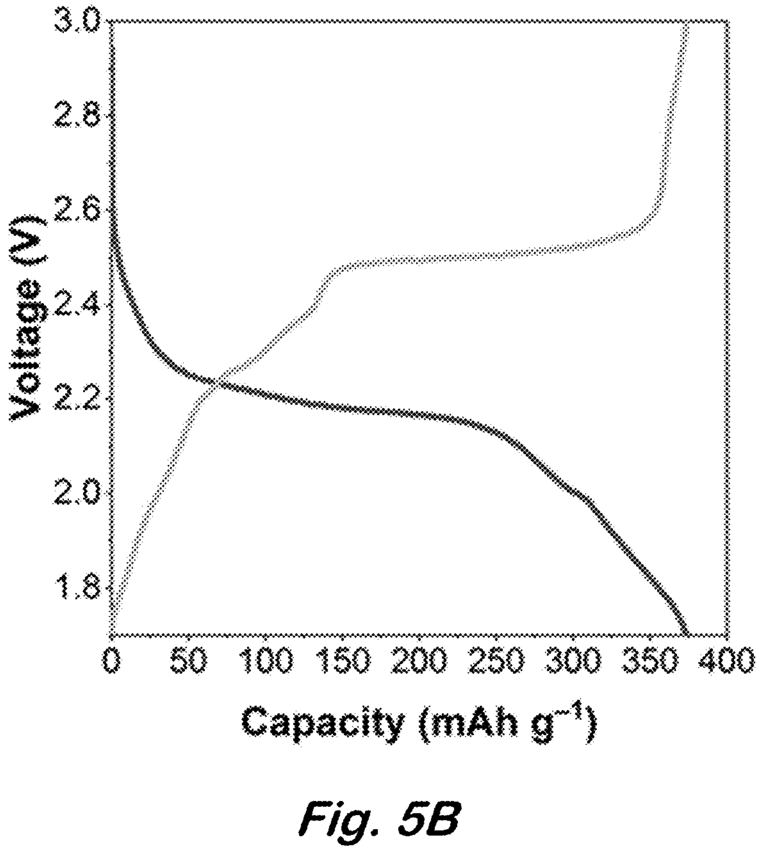
Figure 6:
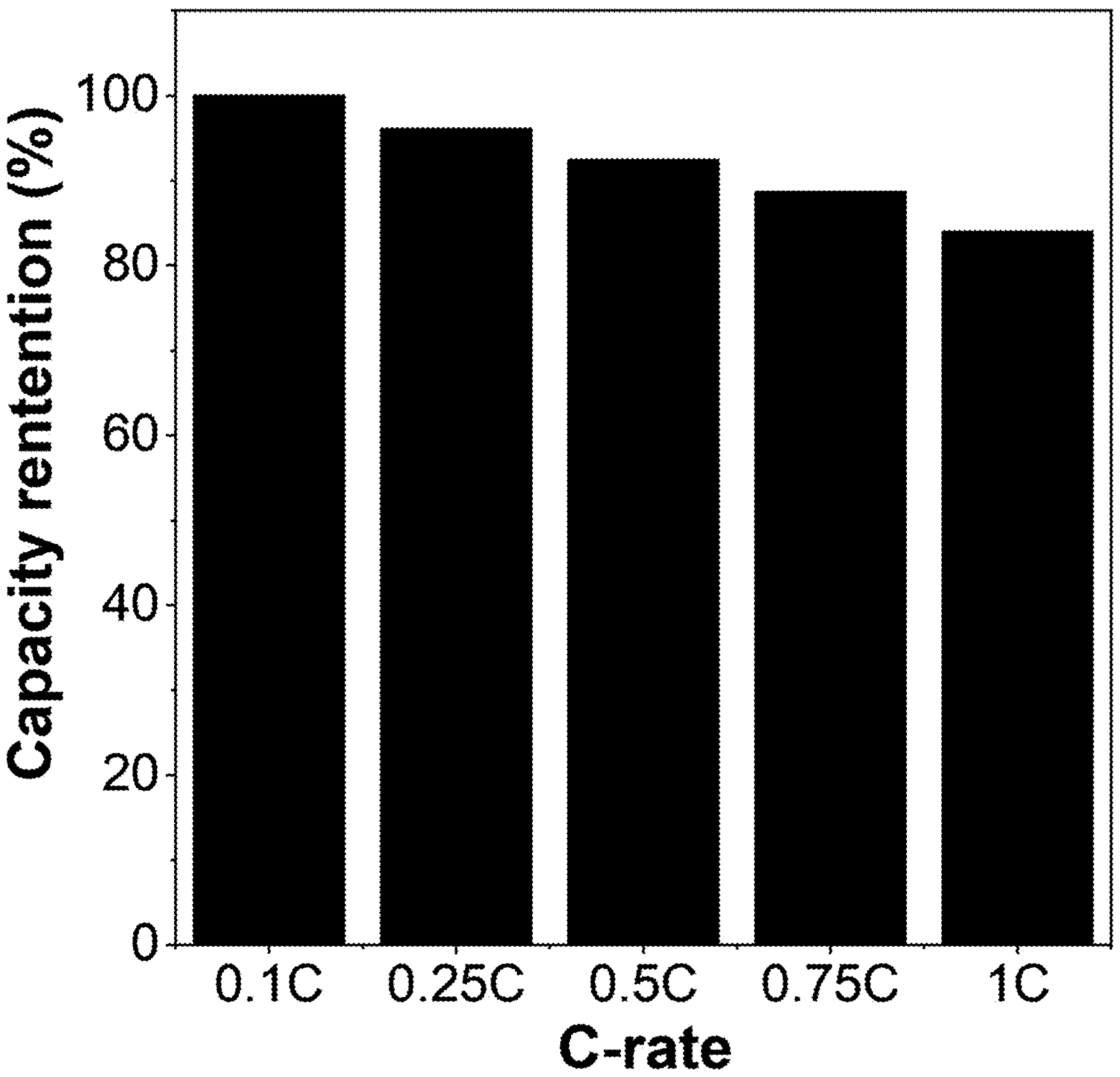
FIG. 6 shows discharge capacity retention of $Li_2FeS_2$:c.l.800 for increasing C-rate (based on 1 $e^-$ redox; 200 mAh $g^{-1}$).
Figure 7:
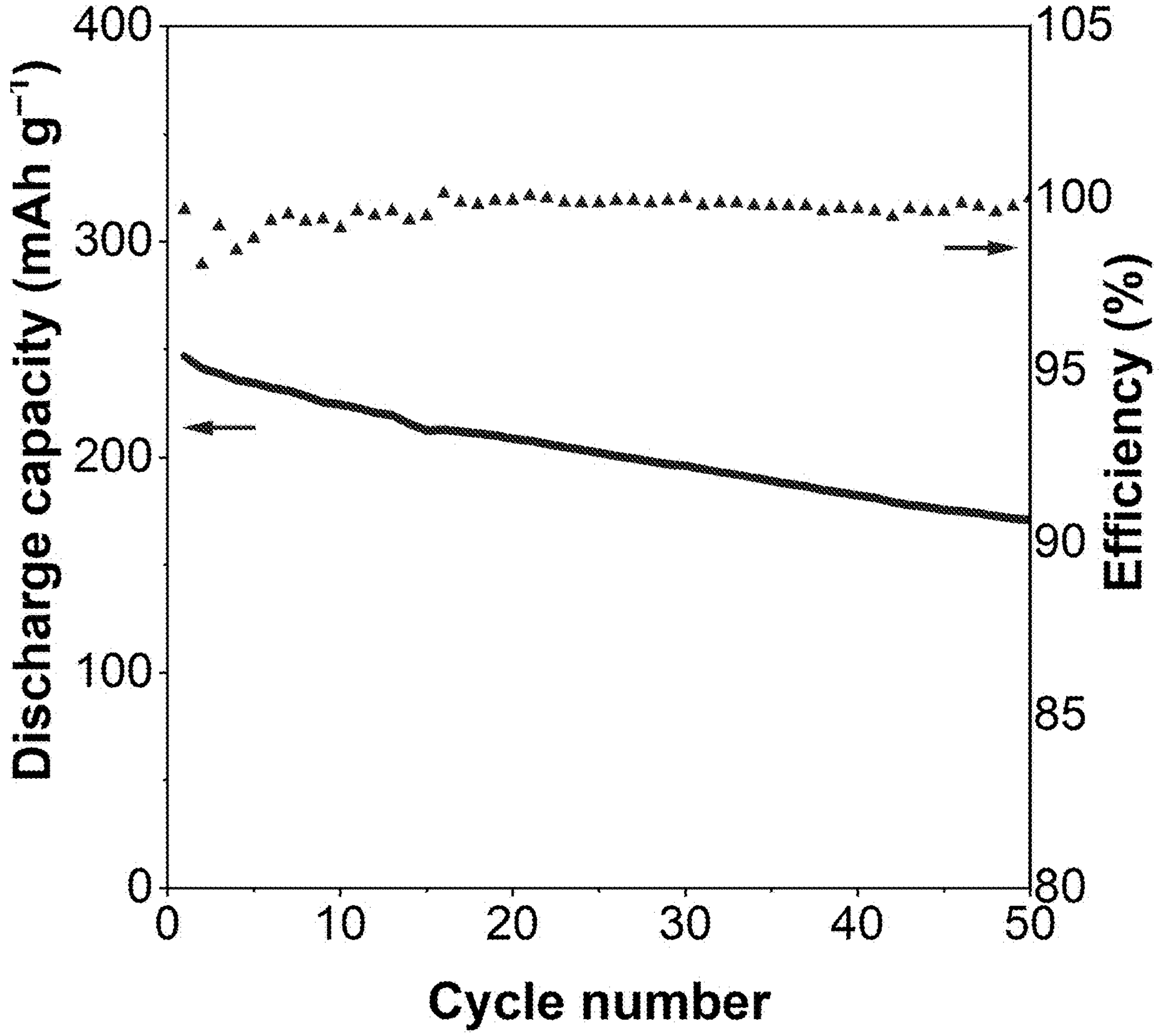
FIG. 7 shows cycling retention of $Li_2FeS_2$:c.l.800 at 0.25C (based on 1 $e^-$ redox; 200 mAh $g^{-1}$).
Figure 8:
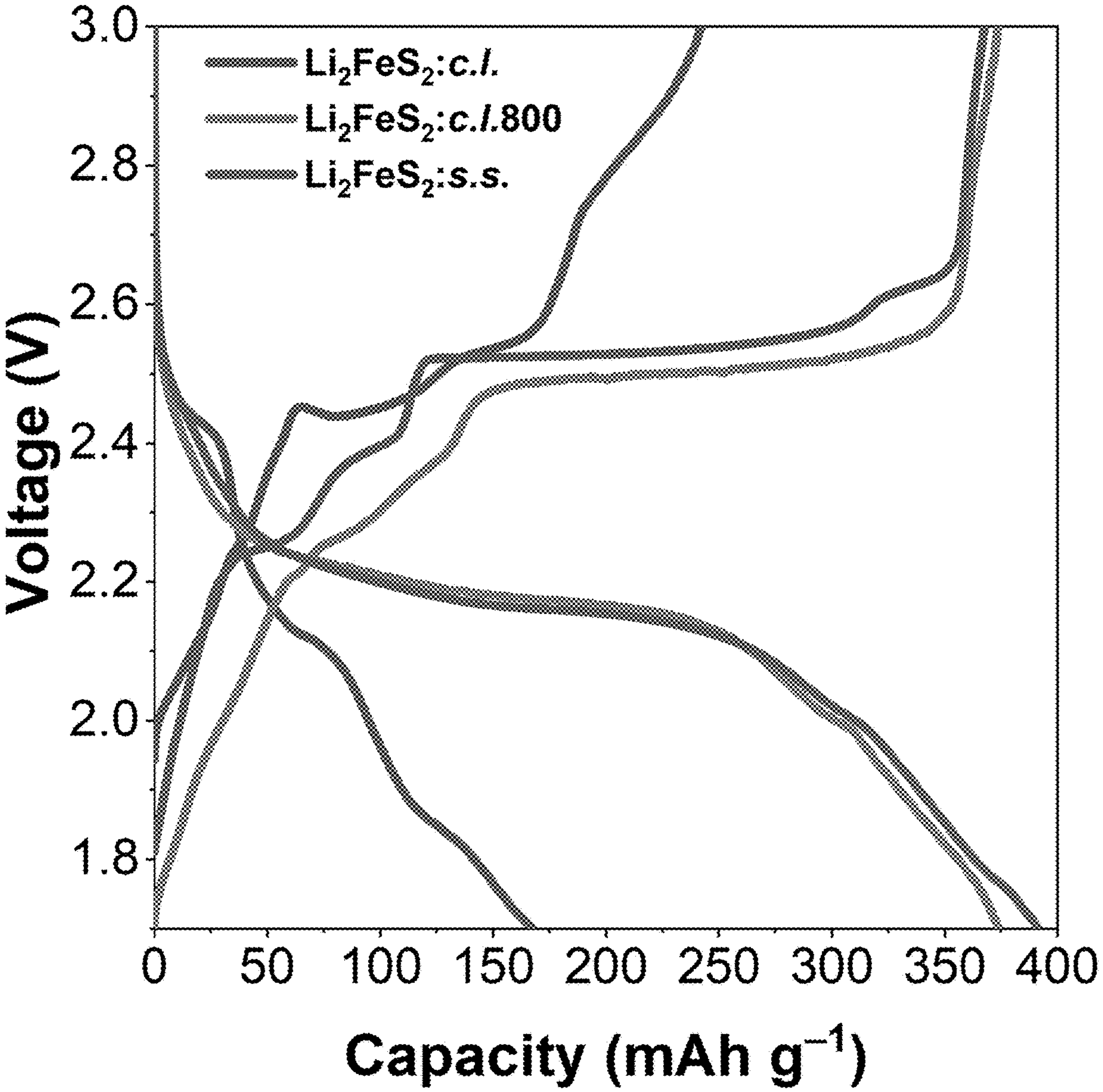
FIG. 8 shows a comparison of galvanostatic charge/discharge (20 mA $g^{-1}$) for $Li_2FeS_2$:c.l., $Li_2FeS_2$:c.l.800, and $Li_2FeS_2$:s.s. in a half-cell configuration.

The electrochemical viability of $Li_2FeS_2$:c.l.800 in a half-cell configuration using both cyclic voltammetry and galvanostatic charge/discharge was demonstrated (FIGS. 5-7). During oxidation, two distinct redox processes in the voltammogram were observed that are ascribed to $Fe^{2+}/Fe^{3+}$ at ~2.3 V and $S^{2-}/S_2^{2-}$ at ~2.6 V. Only one peak appears during the negative voltage sweep suggesting concomitant iron and sulfur redox.[9] Under slow galvanostatic conditions (C/10 based on 1 $e^-$ redox; 200 mAh $g^{-1}$), $Li_2FeS_2$:c.l.800 reversibly stores ~375 mAh $g^{-1}$ or >1.8 $e^-$, comparable to state-of-the art performance of the material synthesized via solid-state reaction (FIG. 8).[9]

Redox potential-matched chemical lithiation offers a versatile pathway to create lithium-rich materials. In contrast with the solid-state synthetic methods traditionally used to make $Li_2FeS_2$, the chemical lithiation approach produces smaller primary particles and provides an adaptable platform for compositional tuning. Adjusting the size and end groups of the polyaromatic hydrocarbon modulates the chemical potential of lithiation, affording synthetic flexibility and direct nanoscaling of various lithium-rich transition-metal sulfides.[27]

Figure 9:
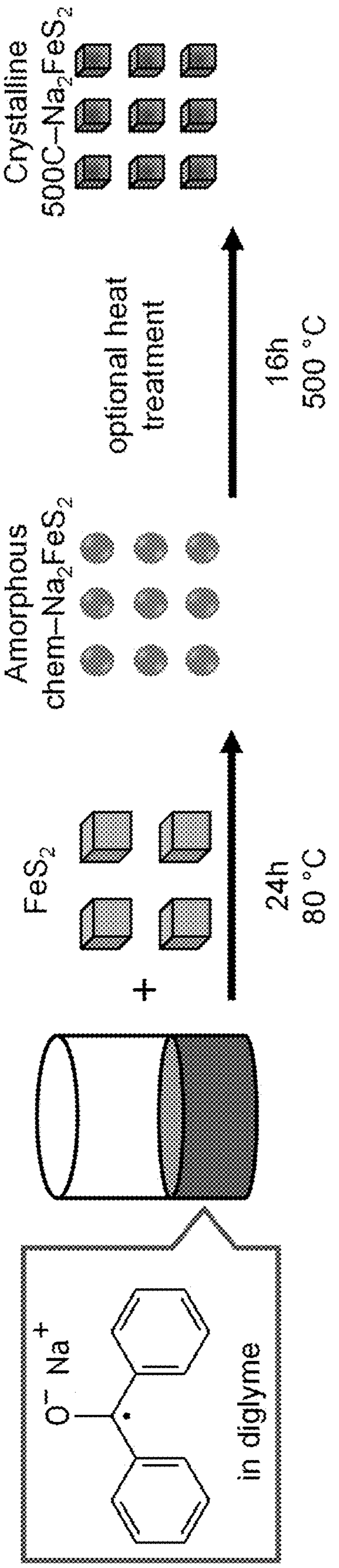
FIG. 9 shows a schematic of the chemical sodiation of $FeS_2$ to produce amorphous chem-$Na_2FeS_2$ and subsequent heat treatment to crystallize the sodiated product to 500C—$Na_2FeS_2$.

To chemically synthesize $Na_2FeS_2$, equimolar quantities of benzophenone and sodium metal are dissolved in diglyme at ~80° C. in an Ar-filled glovebox (FIG. 9, method details described below). The blue solution that forms after ~1 h confirms the presence of a Na-benzophenone adduct.[7] Pyrite-$FeS_2$ powder is added to this solution, which is then stirred overnight. The resulting sodiated product (denoted "chem-$Na_2FeS_2$") is collected by centrifugation, rinsed in excess diglyme, and dried at ~80° C. on a hotplate in the glovebox.

Figure 10:
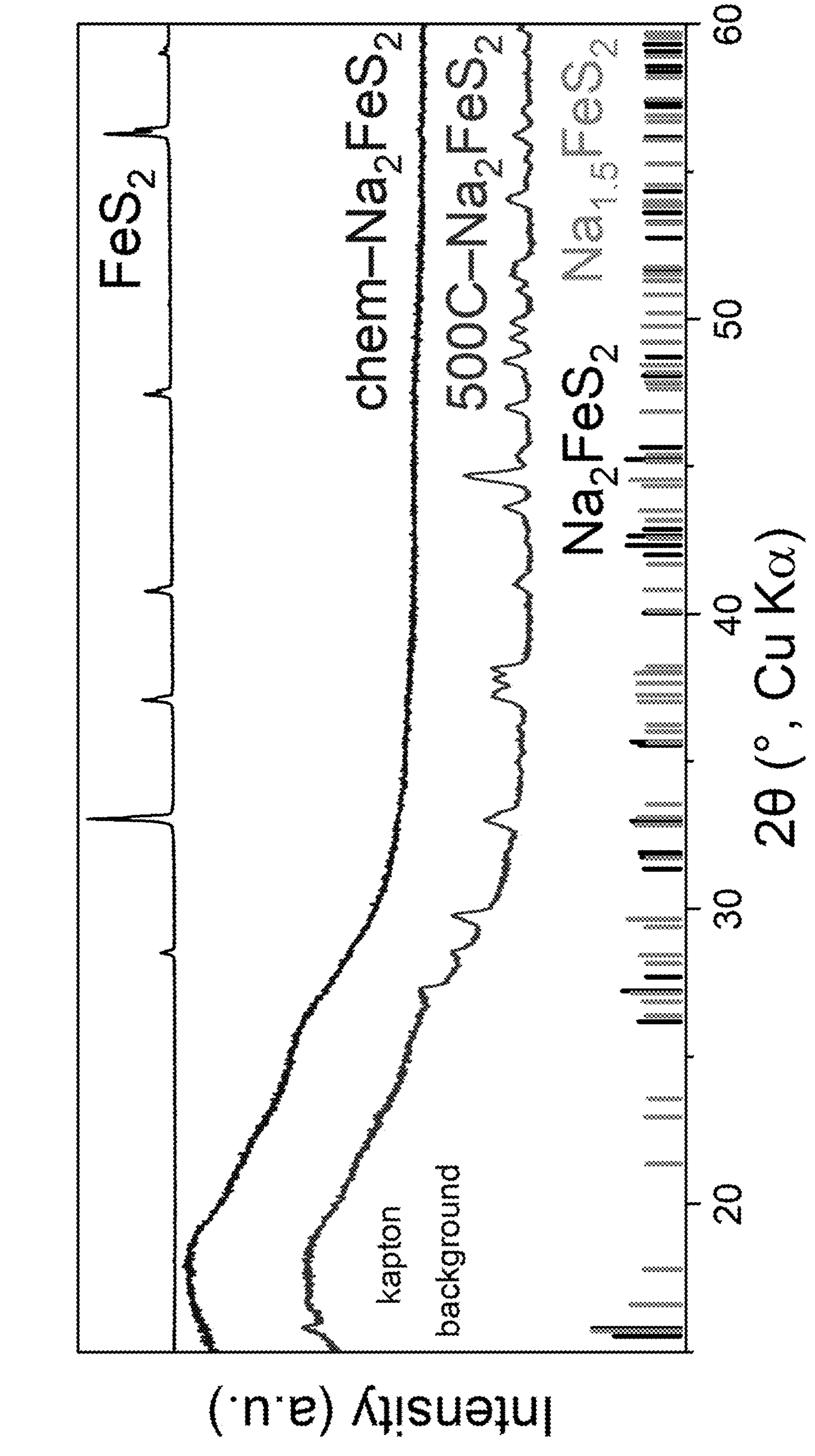
FIG. 10 shows materials characterization of pyrite-$FeS_2$, chem-$Na_2FeS_2$, 500C—$Na_2FeS_2$. X-ray diffractograms with reference compounds $Na_2FeS_2$ (ICSD: 432210) and $Na_{1.5}FeS_2$ (ICSD: 100357) shown for comparison.
Figure 11:
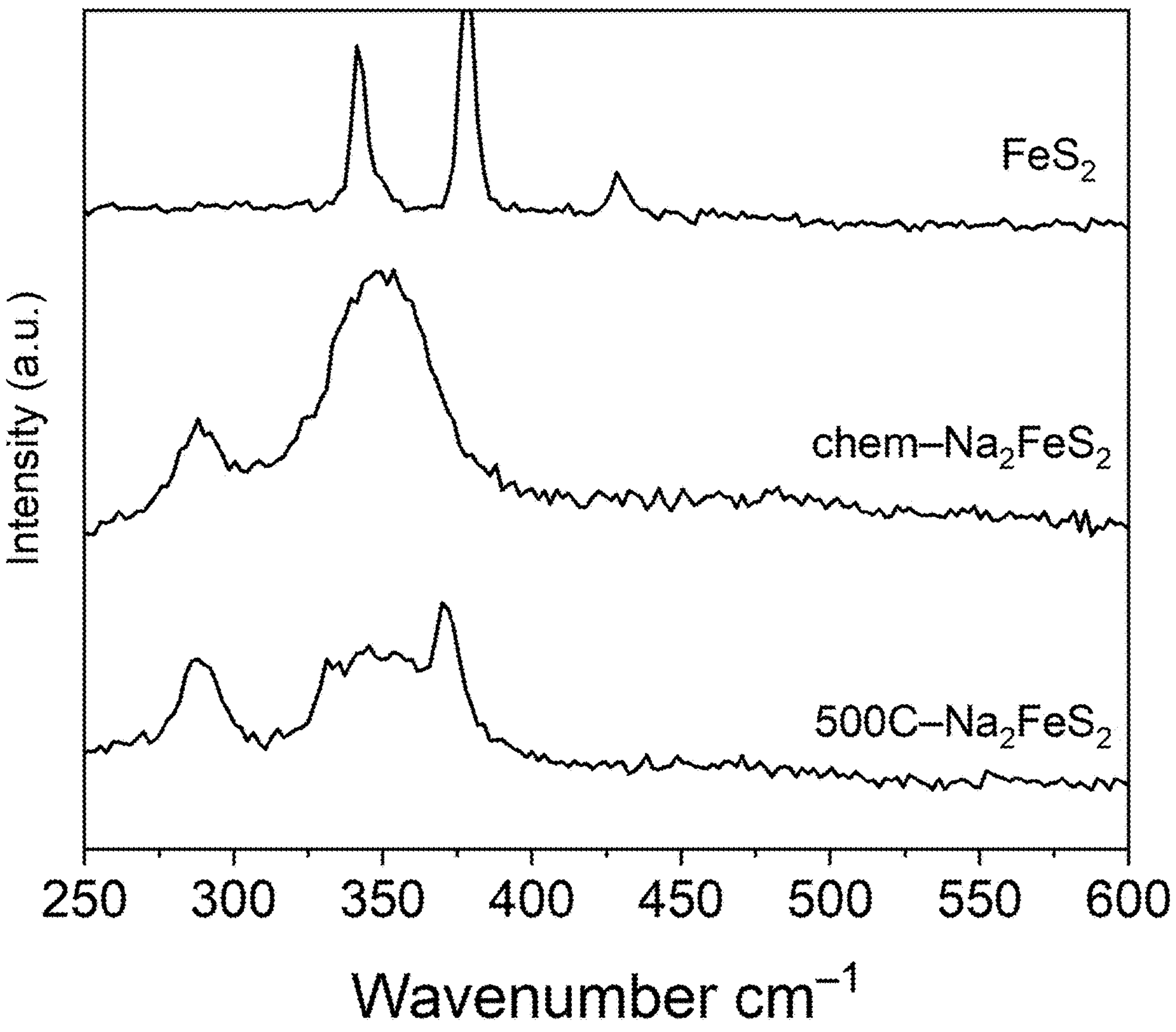
FIG. 11 shows Raman spectra of $FeS_2$, chem-$Na_2FeS_2$, and 500C—$Na_2FeS_2$.
Figure 12:
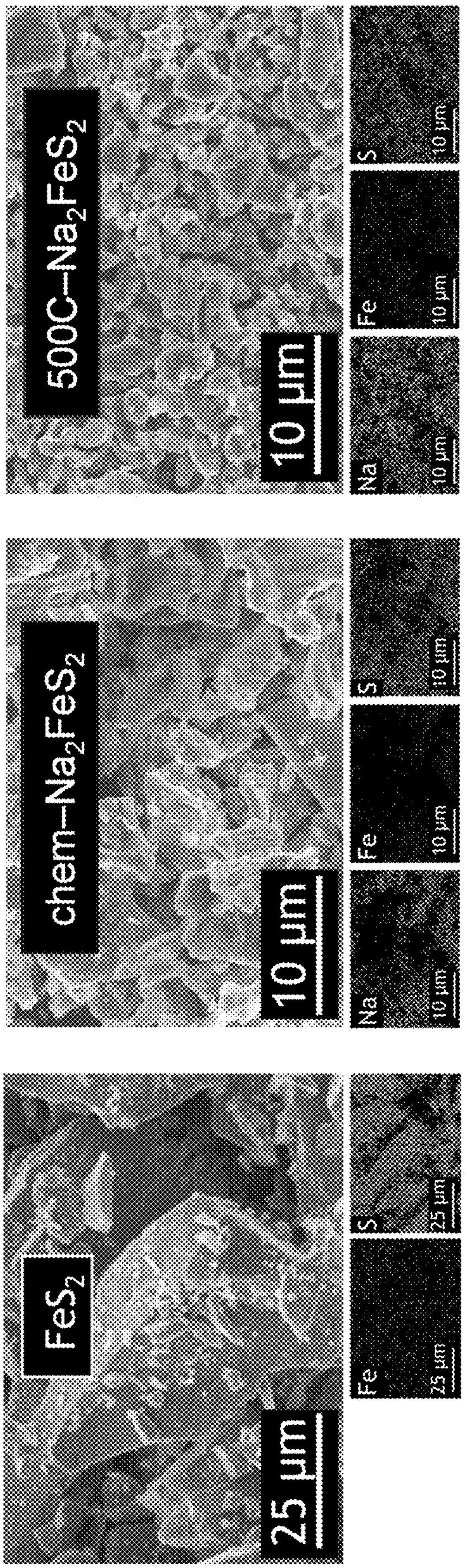
FIG. 12 shows scanning electron micrographs and the corresponding elemental maps from energy-dispersive X-ray spectroscopy.

As-synthesized chem-$Na_2FeS_2$ is amorphous by X-ray diffraction (XRD); the absence of residual pyrite-$FeS_2$ peaks confirms complete reaction of the starting material (FIG. 10). Post-synthesis thermal processing at 500° C. transforms the amorphous, as-synthesized chem-$Na_2FeS_2$ to a moderately crystalline, mixed-phase product (denoted "500C—$Na_2FeS_2$") consisting of $Na_2FeS_2$ and $Na_{1.5}FeS_2$. Raman spectroscopy in the S region shows standard peaks for $FeS_2$ (FIG. 11). New, broad peaks appear for chem-$Na_2FeS_2$, which narrow upon thermal treatment (500C—$Na_2FeS_2$). Scanning electron micrographs (FIG. 12) reveal that chemical sodiation produces particle sizes smaller than the starting $FeS_2$ material, likely arising from exfoliation due to crystallographic contraction (pyrite-$FeS_2$ unit cell=159 $Å^3$, $Na_2FeS_2$=103 $Å^3$); a similar phenomenon was observed with chemical lithiation.[28] Homogeneous sodiation is further corroborated by the prominent Na signal in the energy-dispersive X-ray spectroscopy maps.

Analysis of Na and Fe content in chem-$Na_2FeS_2$ by inductively-coupled plasma-optical emission spectroscopy (ICP-OES) yields a stoichiometry of $Na_{2.0}FeS_{2.7}$, with S content inferred by mass balance (S content may be artificially inflated by the presence of residual benzophenone or diglyme adducts). Heat treatment removes any residual organics such that ICP-OES analysis of 500C—$Na_2FeS_2$ confirms the targeted stoichiometry ($Na_{2.0}FeS_{2.0}$).

Figure 13A:
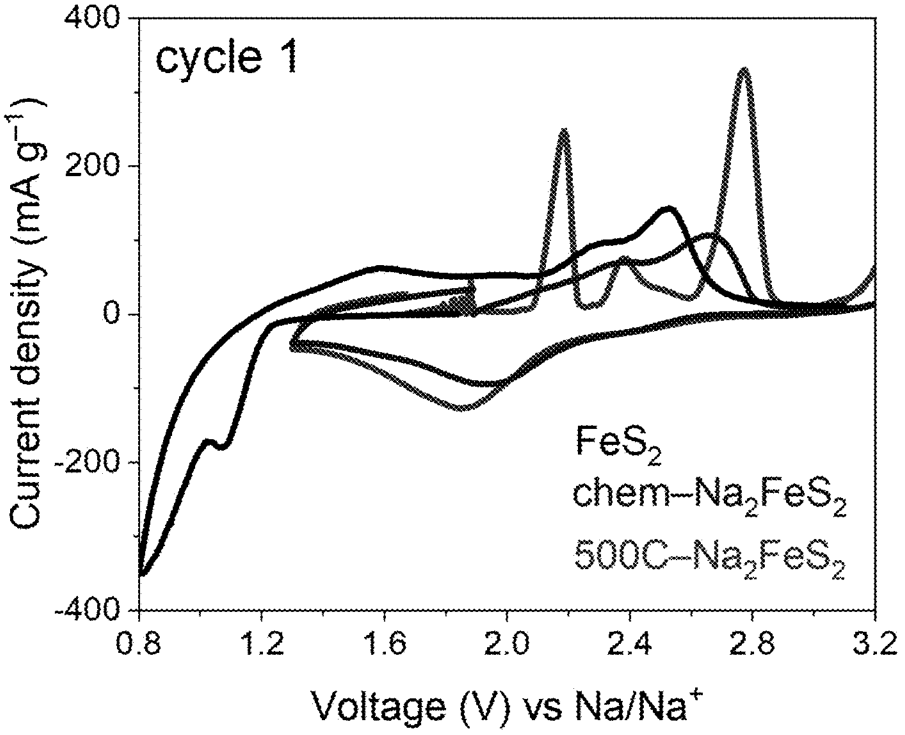
FIGS. 13A-B show voltammograms at 0.1 mV $s^{-1}$ for electrodes containing chem-$Na_2FeS_2$, 500C—$Na_2FeS_2$, and $FeS_2$ (FIG. 13A cycle 1, FIG. 13B cycle 2). The chem-$Na_2FeS_2$ and 500C—$Na_2FeS_2$ cells start at open-circuit (~1.8 V), are swept in the positive direction to 3.2 V (desodiated), then in the negative direction to 1.3 V (sodiated) for two cycles. The $FeS_2$ cell starts at open-circuit (~1.7 V), is swept in the negative direction to 0.8 V (sodiated), then in the positive direction (desodiated). Two-electrode configuration: counter/quasi-reference is a preconditioned Na metal electrode.
Figure 13B:
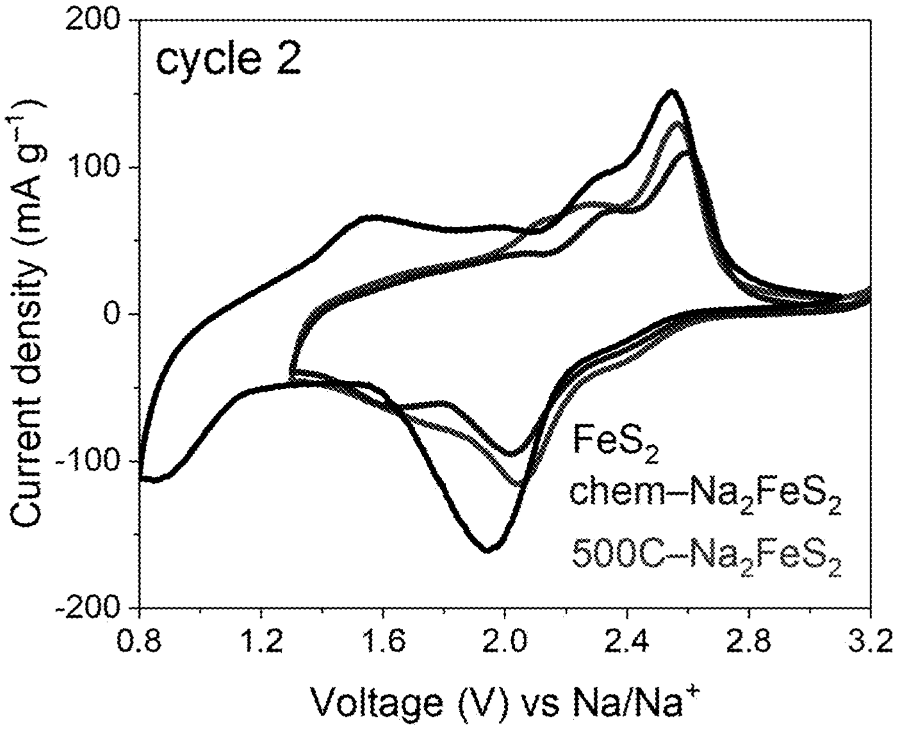
Figure 14:
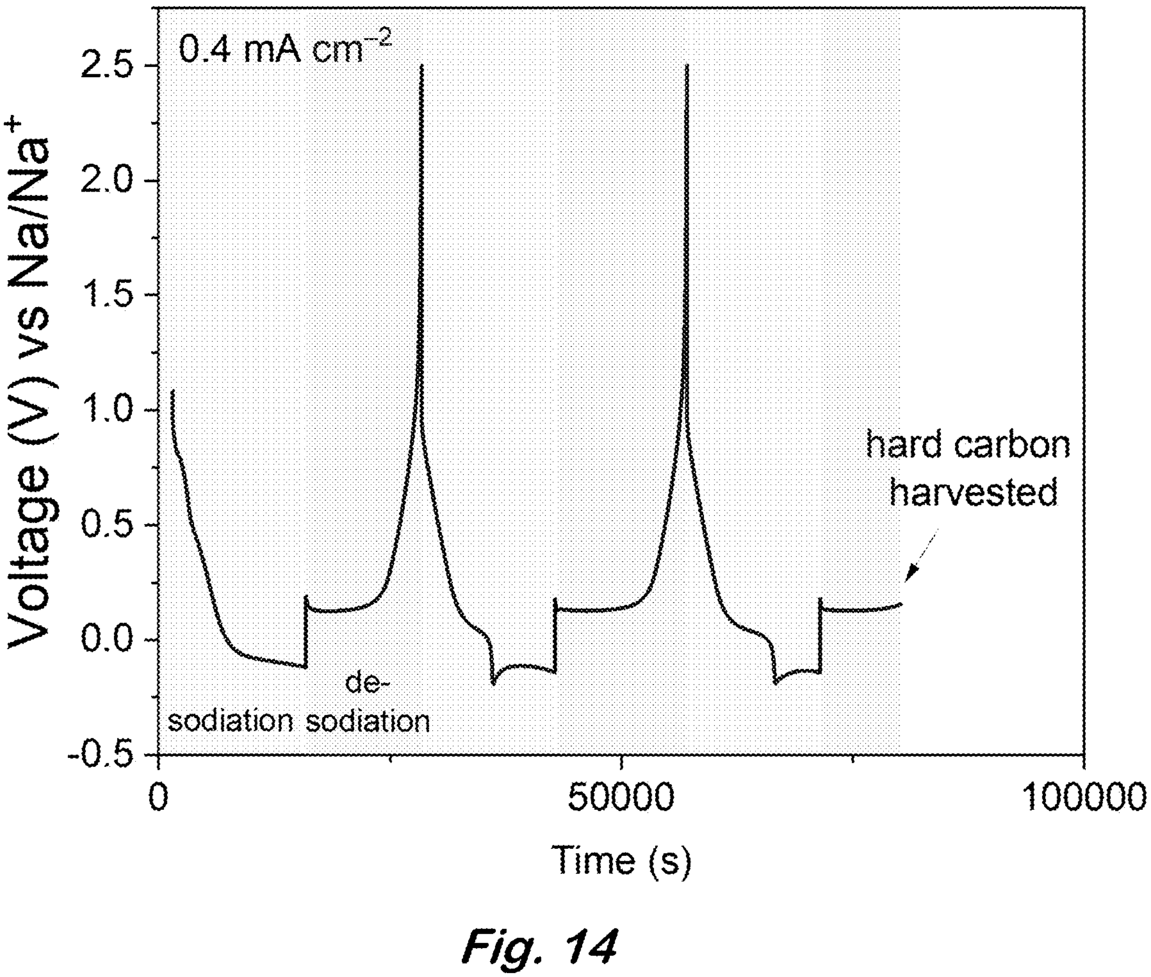
FIG. 14 shows the conditioning profile for hard-carbon||Na metal cells. Conditioned HC is used in HC||$Na_2FeS_2$ electrochemical experiments.
Figure 15:
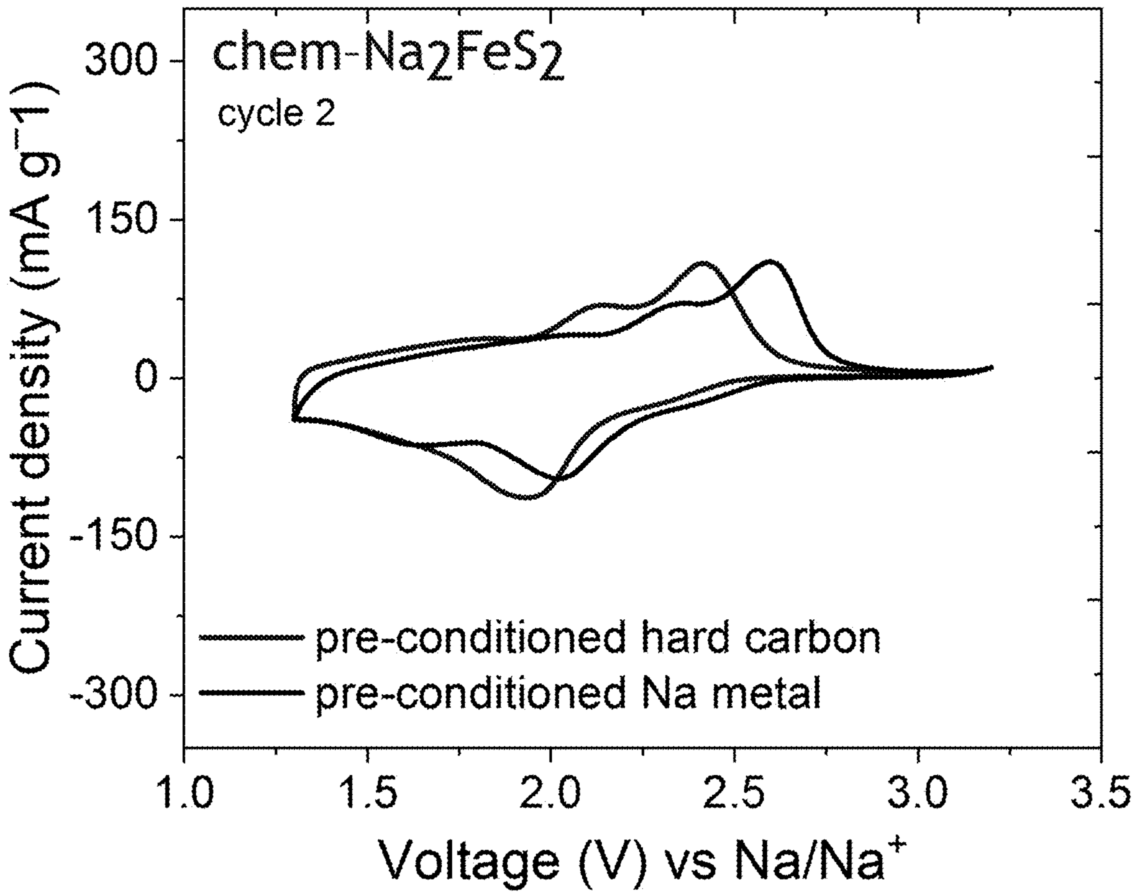
FIG. 15 shows a comparison of chem-$Na_2FeS_2$ pre-conditioned hard carbon anode and chem-$Na_2FeS_2$||pre-conditioned Na metal anode.

Next the electrochemical behavior of chem-$Na_2FeS_2$, and 500C—$Na_2FeS_2$ was interrogated in a two-terminal coin cell configuration, where the positive electrode consists of the active material, conductive carbon, and polymer binder pressed into a nickel foam current collector (FIGS. 13A-B). The negative electrode for most electrochemical tests is pre-conditioned Na metal (see FIG. 14 for conditioning process); in some cases pre-conditioned hard carbon was used, which is functionally equivalent with a ~0.2 V offset from Na metal (FIG. 15). The electrochemical window is set to 1.3-3.2 V vs Na/$Na^+$ to avoid entering the voltage range for the conversion reaction to $Na_2S$ and Fe metal.[30] Cyclic voltammograms (CVs) of chem-$Na_2FeS_2$ exhibit two oxidation peaks near 2.3 V and 2.6 V, and a single reduction peak near 2.0 V, with minimal change between the first and second cycles (FIGS. 13A-B). Integrating the first-cycle voltammogram for chem-$Na_2FeS_2$ yields desodiation and sodiation capacities of 229 mAh $g^{-1}$ and 219 mAh $g^{-1}$, respectively, representing ~70% of the theoretical 2 $e^-$ capacity (323 mAh $g^{-1}$) or 1.42 $e^-$.

The electrochemical behavior of 500C—$Na_2FeS_2$ differs from chem-$Na_2FeS_2$ during the first oxidative CV sweep, displaying three prominent and defined peaks at 2.2 V, 2.4 V, and 2.8 V (241 mAh $g^{-1}$; FIG. 13A). The following reductive sweep of 500C—$Na_2FeS_2$ (246 mAh $g^{-1}$) closely resembles chem-$Na_2FeS_2$, as does the entire second-cycle voltammogram (FIG. 13B). The electrochemical performance of 500C—$Na_2FeS_2$ is nearly identical to that of thermally synthesized $Na_2FeS_2$ reported by Nasu et al.[31] They observed defined plateaus in the first galvanostatic charge (oxidation) followed by sloped discharge/charge voltage behavior on subsequent cycles and noted that crystalline $Na_2FeS_2$ becomes amorphous when fully desodiated. This finding supports the hypothesis that 500C—$Na_2FeS_2$ loses long-range crystalline order during electrochemical cycling and consequently displays similar electrochemical behavior to that of chem-$Na_2FeS_2$ The voltametric behavior of chem-$Na_2FeS_2$ closely resembles that of $Na_2FeS_2$ prepared by electrochemical sodiation, but after an initial "formation" cycle for the latter.[30,32-43] To compare with these prior reports, the pyrite precursor was electrochemically sodiated under similar voltametric conditions to those for chem-$Na_2FeS_2$, but with a slightly more negative voltage limit (0.8 V vs $Na/Na^+$). Negligible redox activity was observed until sweeping the voltage below 1.2 V vs $Na/Na^+$ (346 mAh $g^{-1}$); the subsequent oxidation displays a small peak at 1.6 V and two prominent peaks around 2.2 V and 2.5 V (283 mAh $g^{-1}$; FIG. 13A). The small oxidation peak is attributed to conversion redox that occurs at sodiation levels beyond $Na_2FeS_2$ and below 1.1 V. On the second cycle the reduction peak shifts to ~1.9 V, a significant (~0.8 V) change from the first cycle (FIG. 13B). The second-cycle similarity of chem-$Na_2FeS_2$, 500C—$Na_2FeS_2$, and $FeS_2$ suggests that similar redox reactions are occurring in all materials regardless of preparation method.

Figure 16A:
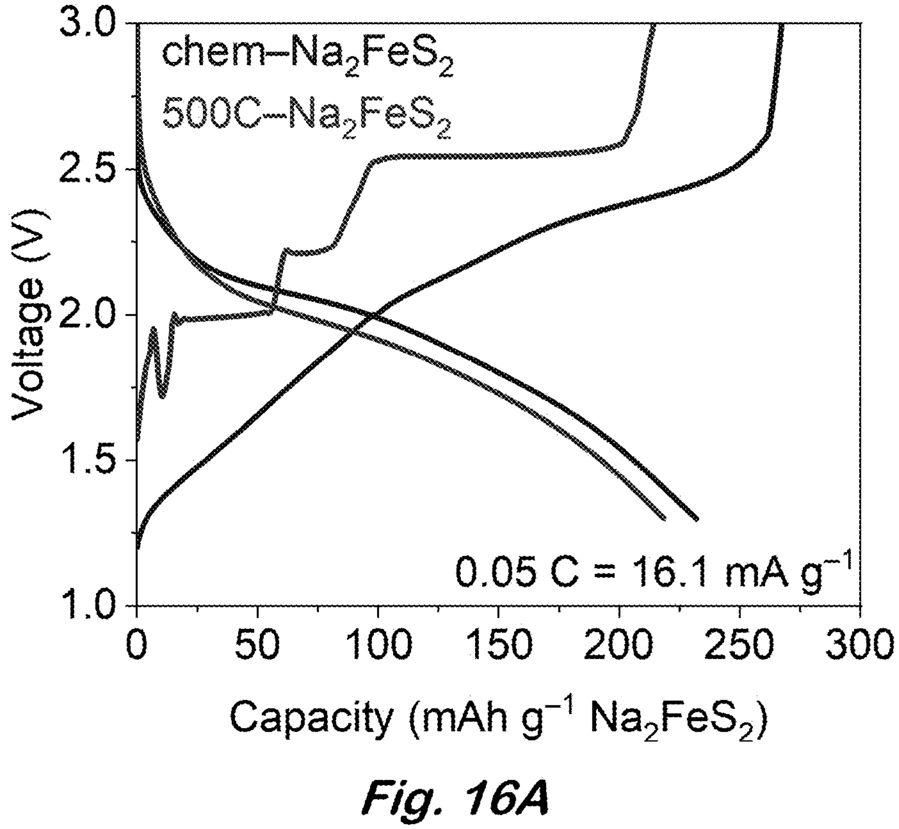
FIGS. 16A-B show voltage-capacity curves for galvanostatic charge/discharge of chem-$Na_2FeS_2$ and 500C—$Na_2FeS_2$ cells (FIG. 16A) and long-term galvanostatic charge/discharge performance of chem-$Na_2FeS_2$ and 500C—$Na_2FeS_2$ cells (FIG. 16B).
Figure 16B:
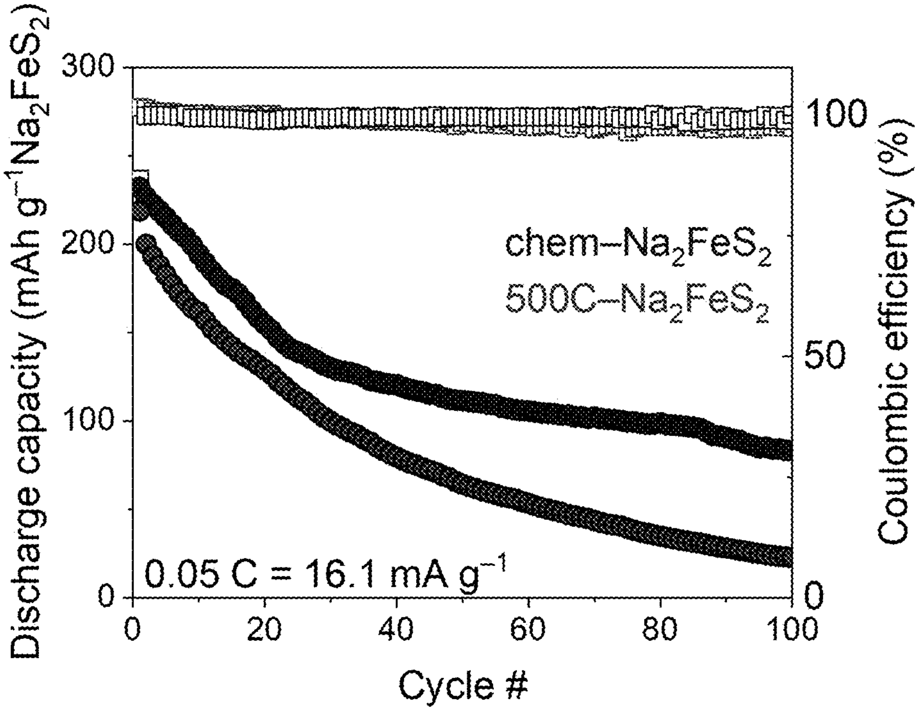

First-cycle galvanostatic charge-discharge curves of chem-$Na_2FeS_2$ and 500C—$Na_2FeS_2$ are consistent with the CVs, where chem-$Na_2FeS_2$ exhibits gradual sloping behavior and 500C—$Na_2FeS_2$ shows clear charge plateaus corresponding to the oxidation voltages in the first-cycle voltammogram (FIG. 16A). Second-cycle charge/discharge profiles for chem-$Na_2FeS_2$ and 500C—$Na_2FeS_2$ converge to a similar sloping shape and capacity. Long-term galvanostatic cycling reveals steady capacity fade per cycle but high Coulombic efficiency (>99.2%), with chem-$Na_2FeS_2$ outperforming 500C—$Na_2FeS_2$ (FIG. 16B) in capacity retention. Overall, the electrochemical results demonstrate that the chemical sodiation protocol produces $Na_2FeS_2$ that is functionally similar to that made by high-temperature or electrochemical methods, albeit without the need for extra thermal energy input or cumbersome formation cycles.

Figure 17:
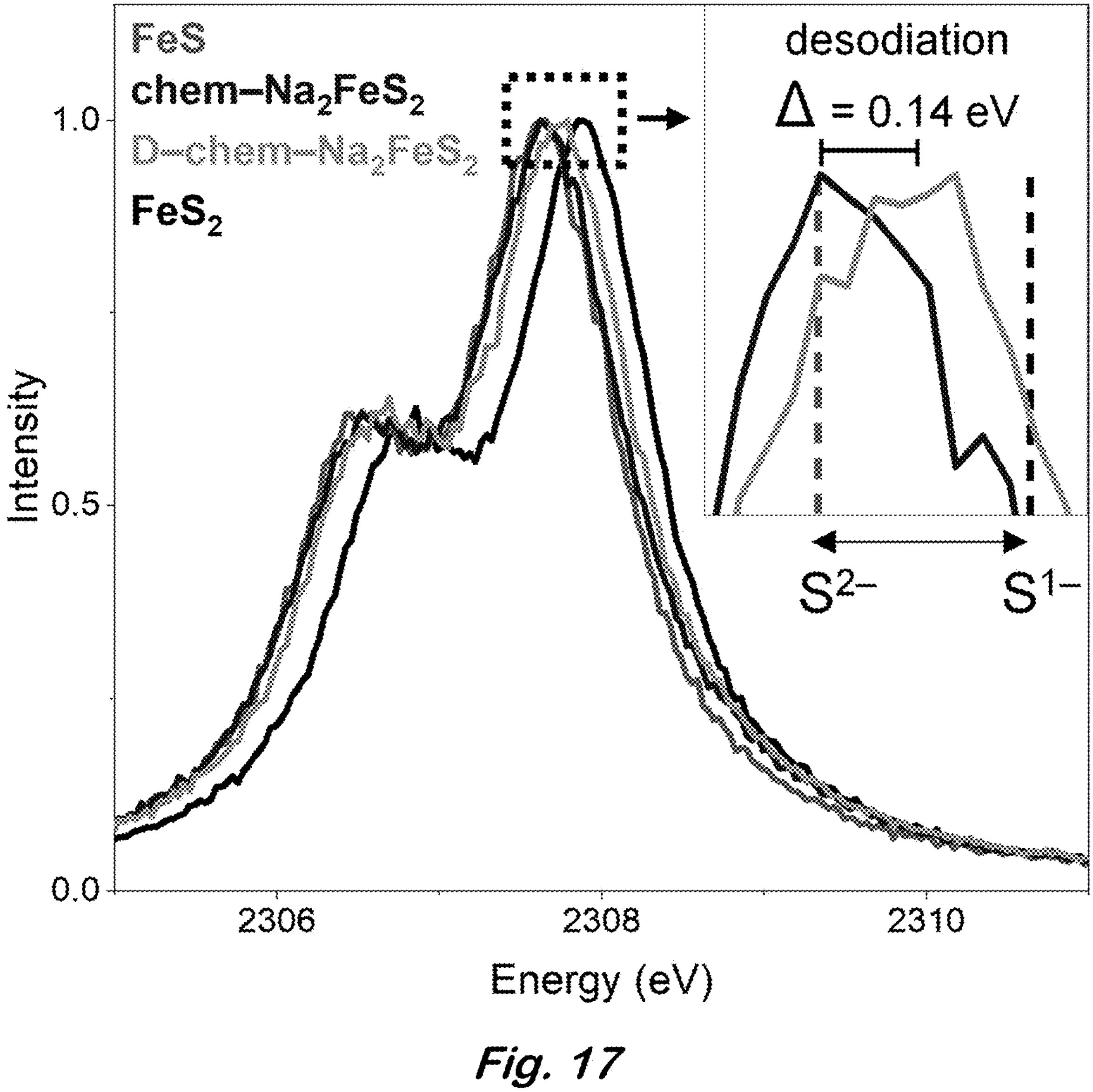
FIG. 17 shows X-ray emission spectra of FeS ($S^{2-}$), chem-$Na_2FeS_2$, D-chem-$Na_2FeS_2$ and $FeS_2$ $(S—S)^{2-}$. The inset shows enhanced scale of spectra, with standards FeS and $FeS_2$ represented as dashed lines at peak maximums.
Figure 18:
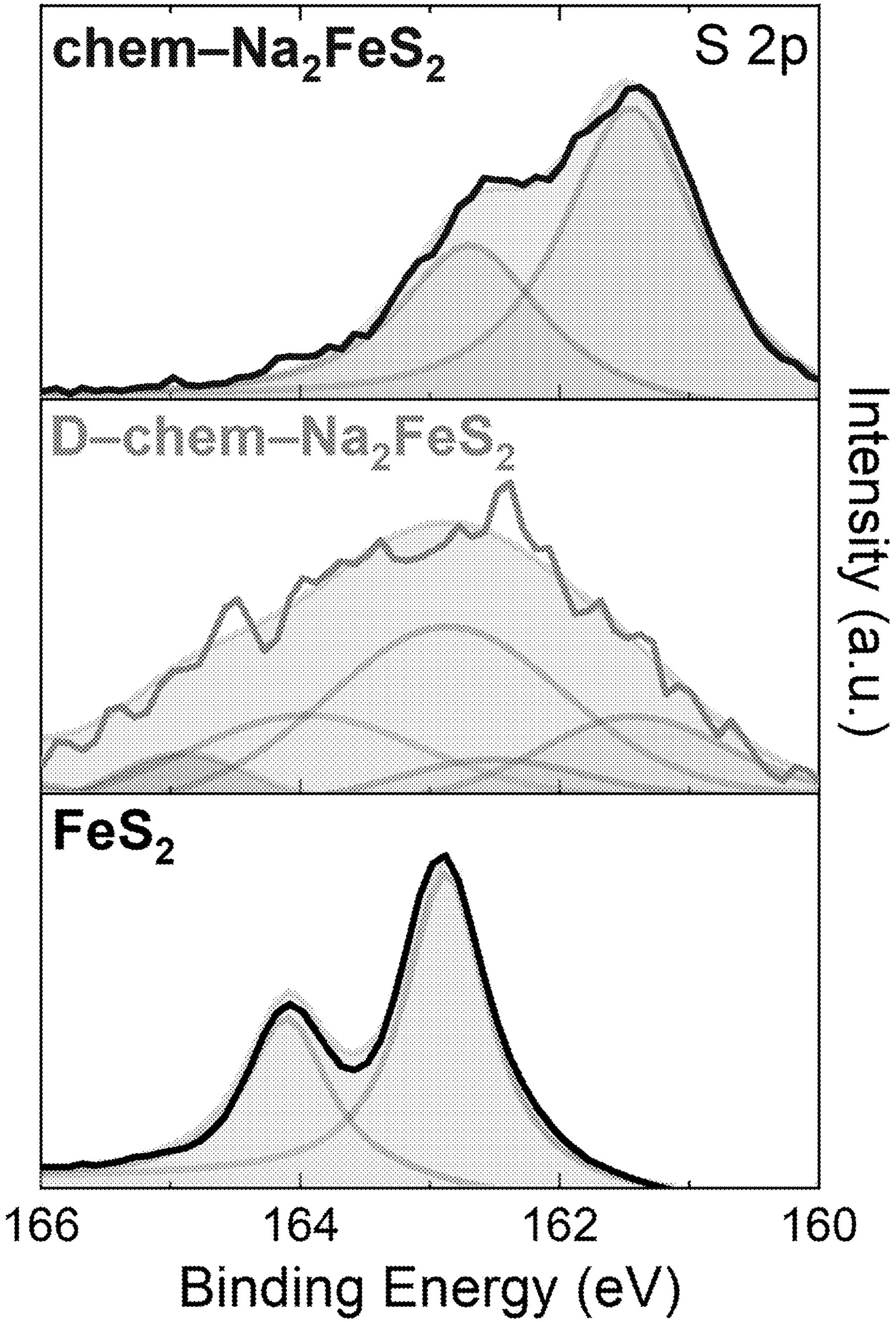
FIG. 18 shows S 2p X-ray photoelectron spectra of chem-$Na_2FeS_2$, D-chem-$Na_2FeS_2$ and $FeS_2$.
Figure 20:
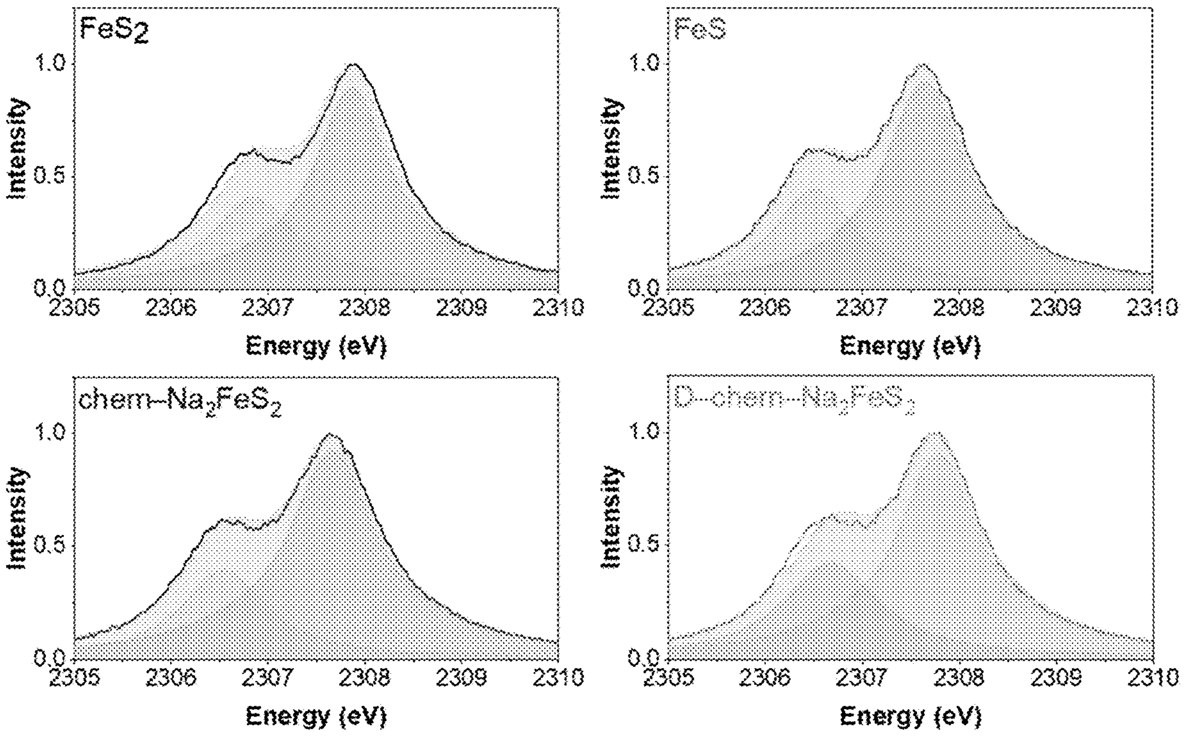
FIG. 20 shows peak-fits of X-ray emission spectra for $FeS_2$, FeS, chem-$Na_2FeS_2$, and D-chem-$Na_2FeS_2$.

To further investigate the respective participation of S- and Fe-based redox for $Na^+$-storage, pristine chem-$Na_2FeS_2$ and electrochemically desodiated chem-$Na_2FeS_2$ (denoted "D-chem-$Na_2FeS_2$") were analyzed using ex situ X-ray emission spectroscopy (XES), X-ray photoelectron spectroscopy (XPS), and X-ray absorption near edge spectroscopy (XANES). First chem-$Na_2FeS_2$ (as an electrode) was compared with the pyrite-$FeS_2$ precursor powder; the negative shift in the S Kα XES shows that the oxidation state of S is reduced from −1 to −2, consistent with the reduction expected from chemical sodiation (FIG. 17). The initial S oxidation state in chem-$Na_2FeS_2$ resembles that of FeS, where S has a formal charge of −2. Electrochemically removing $Na^+$ from chem-$Na_2FeS_2$ shifts the oxidation state of S back towards −1, an electronic state resembling that of pyrite-$FeS_2$. Quantitative peak fitting analysis of the $K_{\alpha 1}$ peak reveals ~55% of the S converts from sulfide ($S^{2-}$) to disulfide/persulfide $(S—S)^{2-}$, direct evidence that anion redox takes place in chem-$Na_2FeS_2$ (peak fits shown in FIG. 20). Qualitatively similar trends in the S 2p X-ray photoelectron spectra confirm a reduced electronic state in chem-$Na_2FeS_2$ relative to its $FeS_2$ precursor and a shift back towards the −1 state upon electrochemical desodiation (FIG. 18).

Figure 19:
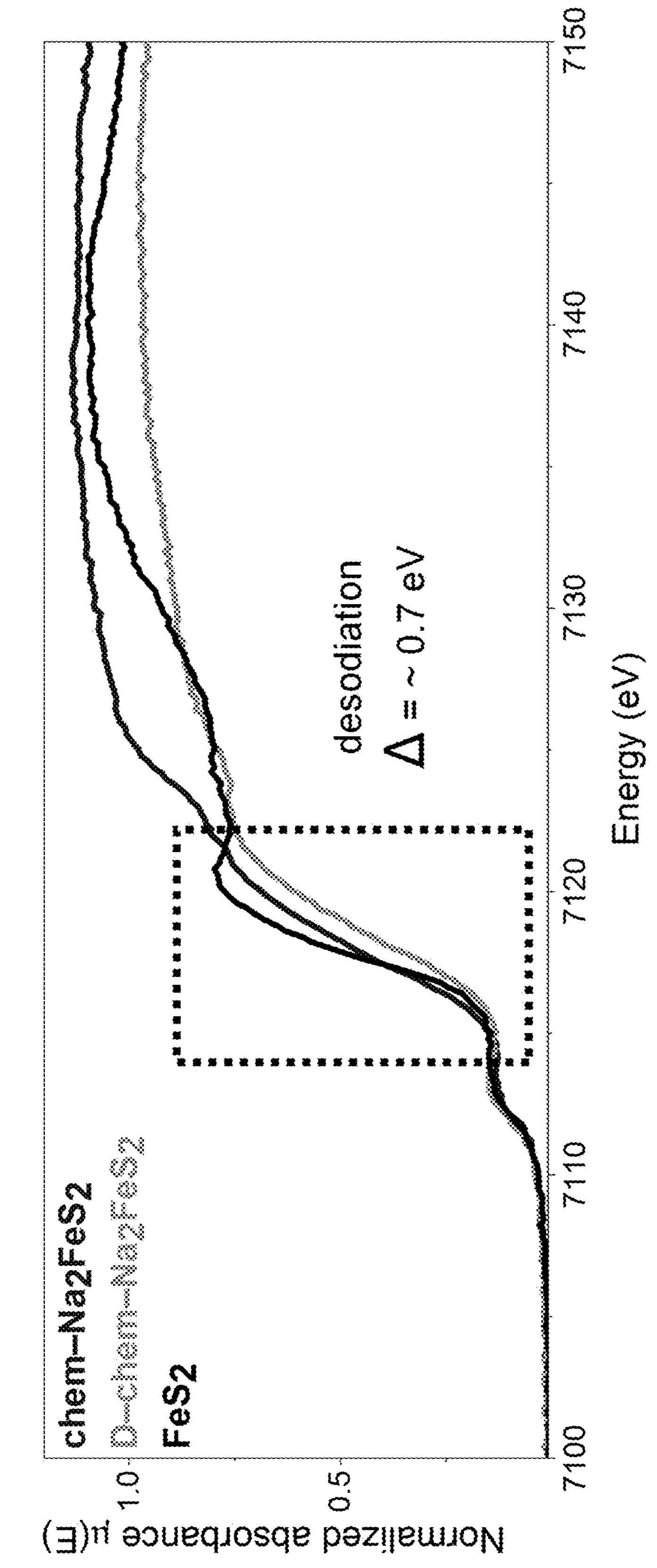
FIG. 19 shows X-ray absorption near edge spectra of chem-$Na_2FeS_2$, D-chem-$Na_2FeS_2$ and $FeS_2$; dashed-box region used for energy shift comparison.
Figure 21:
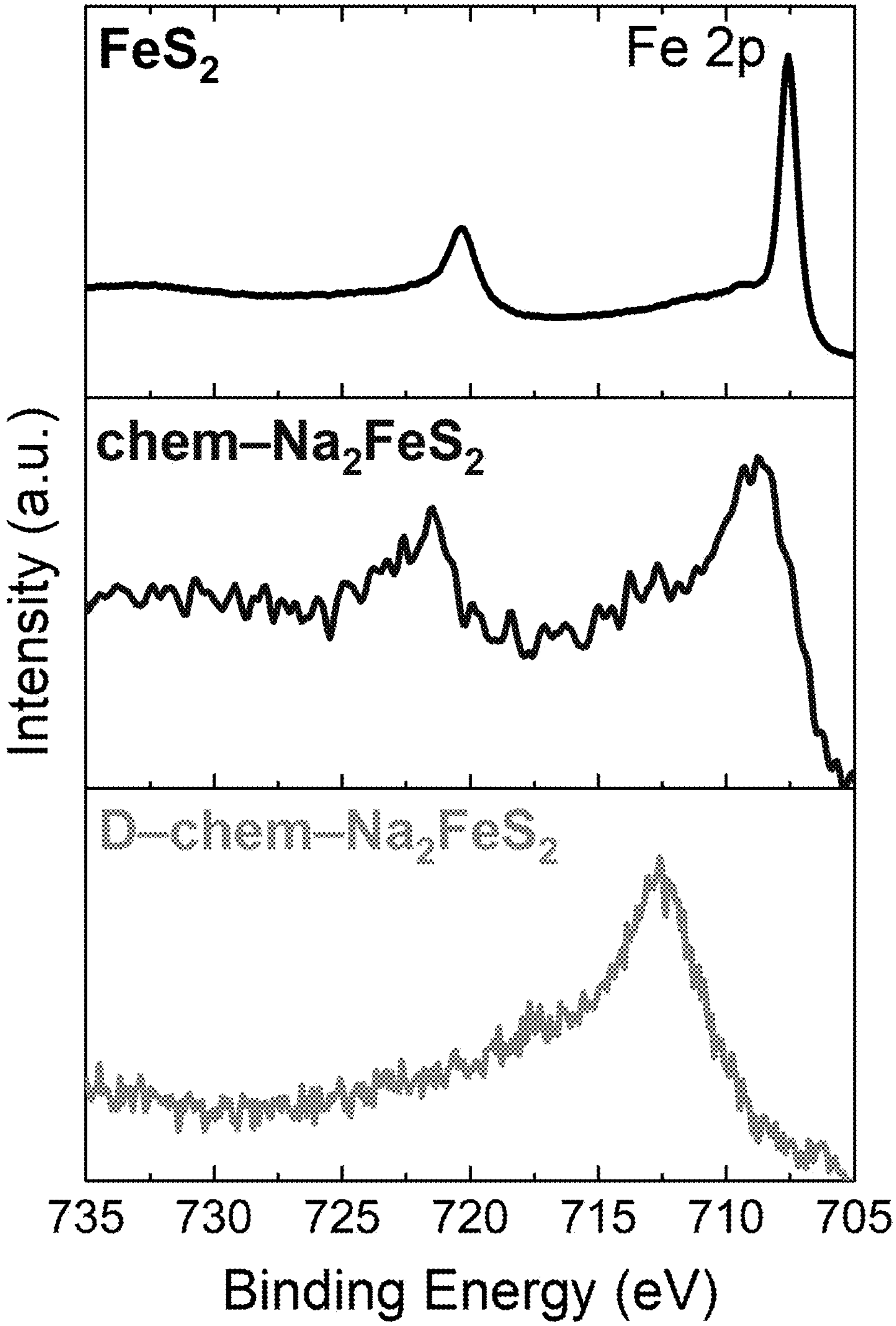
FIG. 21 shows Fe 2p X-ray photoelectron spectroscopy of chem-$Na_2FeS_2$, D-chem-$Na_2FeS_2$ and $FeS_2$.

X-ray absorption spectra at the Fe K-edge (FIG. 19) show that the edge energy (maximum in the derivative of the rising edge) for chem-$Na_2FeS_2$ resembles that of $FeS_2$, both consistent with an $Fe^{2+}$ oxidation state, evidence that the chemical sodiation route does not reduce iron below $Fe^{2+}$. Electrochemical desodiation of chem-$Na_2FeS_2$ shifts the Fe spectrum by +0.7 eV (dashed-box region), indicating the average oxidation state increases from $Fe^{2+}$ towards $Fe^{3+}$ upon $Na^+$ removal. Previous studies have similarly assigned an $Fe^{2+}$ oxidation state to electrochemically sodiated $Na_2FeS_2$, with subsequent electrochemical desodiation generating $Fe^{3+}$.[30] Iron 2p XPS also qualitatively corroborates these trends in Fe oxidation state (FIG. 21).

These results demonstrate the chemical sodiation route is an attractive alternative to conventional high-temperature synthesis and electrochemical sodiation methods for synthesizing $Na_2FeS_2$. This low-temperature approach yields amorphous forms of $Na_2FeS_2$ that still exhibit high specific capacity for Na-ion storage. It is also shown by spectroscopic analysis that charge storage is facilitated by a combination of cation- (Fe) and anion-based (S) redox, a desirable characteristic in next-generation cation-insertion hosts for advanced batteries.

A feature of this synthetic method is the ability to fabricate nanoparticulate, lithium-rich iron sulfide ($Li_2FeS_2$) in contrast to the current solid-state methods that lead to micrometer-sized agglomerates. In addition, this method allows for the possibility of substituting transition metals (e.g., Ni, Co, V, Mn) onto the Fe site in $FeS_2$ prior to chemical lithiation leading to synthesis of novel materials inaccessible by other methods.

Materials and Methods $Li_2FeS_2$-Material synthesis—Inside of an Ar-filled glovebox, 5.25 mmol benzophenone ($Ph_2CO$) [Sigma-Aldrich] was dissolved into 60 mL of diethylene glycol dimethyl ether (Sigma-Aldrich) on a hotplate set to 80° C. After full dissolution, 5.25 mmol lithium metal (MTI corp.) was added to the solution and was stirred for 4 h at 80° C. producing a deep blue color. Next, 2.5 mmol pyrite $FeS_2$ (Sigma-Aldrich) powder was added to the solution and stirred for 8 h at 80° C. The resulting $Li_2FeS_2$ powder was washed with excess diglyme and centrifuged three times within the glovebox and subsequently dried under vacuum. Subsequent heat treatment of the powder was also performed within the glovebox using a small box furnace at 800° C. for 16 h in a graphite crucible. To synthesize $Li_2FeS_2$ via the solid-state method, 3 mmol of $FeS_2$ (Sigma-Aldrich) and 3 mmol of $Li_2S$ (Sigma-Aldrich) were ground together in a mortar and pestle then pressed into a pellet within an Ar-filled glovebox. The pellet was melted at 900° C. and heated for 16 h in a graphite crucible and cooled naturally.

X-ray diffraction (XRD)—Samples for X-ray diffraction were prepared within an Ar-filled glovebox. Powders were pressed into a zero-background Si plate well and covered with Kapton tape to prevent exposure to air. Mounted samples were then tested using a Rigaku MiniFlex diffractometer and Cu Kα radiation (1.5406 Å).

Scanning electron microscopy (SEM)—Powdered samples were adhered to Cu tape and mounted on Al stubs within an argon filled glovebox. The mounted samples were sealed within glass vials and transferred into a JEOL JSM-7600F and evacuated immediately to reduce air exposure. Images were taken at 15 kV with a working distance of 6-8 mm.

Inductively coupled plasma—optical emission spectroscopy (ICP-OES)—Inside an argon filled glovebox, 1.0 mg of chemically lithiated $Li_2FeS_2$ and 1.3 mg of solid-state synthesized $Li_2FeS_2$ were weighed into separate vials. Outside the glovebox, the samples were charged with 1 mL 5% nitric acid in water and then heated at 70° C. for 5 min. After cooling, all solids were visibly dissolved. The cooled solutions were then each diluted to 100 mL volume using 5% nitric acid, yielding the samples for analysis. The ICP-OES was performed on an Agilent 5900 ICP-OES. All samples and standards were prepared in 5% nitric acid. Six standards were prepared ranging from 0.01 mg/L to 10 mg/L Li and Fe concentration in addition to a blank. Additional operating parameters are listed in Table 1.

TABLE 1

Operating conditions for ICP-OES

| Gas | UHP argon |
|---|---|
| Replicate count | 3 |
| Pump speed (rpm) | 12 |
| Rinse time (s) | 30 |
| Read time (s) | 5 |
| RF power (KW) | 1.2 |
| Viewing mode | Radial |
| Viewing height (mm) | 8 |
| Nebulizer flow (L/min) | 0.7 |
| Plasma flow (L/min) | 12 |
| Aux flow (L/min) | 1 |

Electrochemical characterization—Electrodes were prepared by manually grinding a 60:20:20 (wt:wt:wt) mixture of $Li_2FeS_2$:Super P carbon:PTFE powder and pressing the mixture into a ½" diameter Ni foam disc inside of an Ar-filled glovebox. The average active material loading was 0.8 mg $cm^{-2}$. For electrochemical evaluation, the $Li_2FeS_2$@Ni foam electrode was placed within a type 2032 stainless-steel coin cell (MTI corp.) with a Whatman glass fiber separator, 150 μL of 1.0 M lithium hexafluorophosphate in EC:DEC electrolyte (Aldrich), and a Li metal counter electrode (Li chip, MTI corp.).

Using a Gamry Reference 620 potentiostat, the resulting coin cell containing the $Li_2FeS_2$ electrode was interrogated via cyclic voltammetry between 3.0 and 1.7 V at a scan rate of 0.1 mV/s. Galvanostatic charge/discharge measurements were conducted at a rate of 0.1 C with respect to nominal $1e^-$ theoretical capacity of 200 mAh $g^{-1}$ $Li_2FeS_2$.

$Na_2FeS_2$—Materials—Iron disulfide ($FeS_2$, 325 mesh, 99.9%, Aldrich), diglyme (DEG, 99.5%, anhydrous, Aldrich), and benzophenone (99%, Aldrich) were used as received. Na metal was obtained by slicing appropriate pieces from a Na cube (99.9%, Aldrich) using a clean razor blade and used immediately to prevent oxidation of the freshly exposed surface. All materials were stored and handled within an Ar-filled glovebox.

Preparation of chem-$Na_2FeS_2$ and 500C—$Na_2FeS_2$—All synthesis and workup were conducted in an Ar-filled glovebox. For a typical synthesis, 956.6 mg (5.25 mmol) of benzophenone were dissolved in 60 mL of DEG. Next, 120.7 g (5.25 mmol) of fresh Na metal were added to the stirred benzophenone-DEG solution and maintained at 80° C. until the Na fully dissolved (1 h). Lastly, 300 mg (2.5 mmol) of $FeS_2$ were added to the dark blue Na-benzophenone adduct solution, which was then left to stir at 80° C. for 16 h. The resulting fine black precipitate was separated by centrifuging (5500 rpm, 10 min) and discarding the pale-blue supernatant. The black precipitate was washed with fresh DEG and re-centrifuged twice more. After the final rinse, the black precipitate was dried in the centrifuge tubes on a hot-plate at 80° C. and then collected to yield chem-$Na_2FeS_2$ (325 mg, 1.96 mmol, 78% yield). A small portion of chem-$Na_2FeS_2$ was added to a boron nitride crucible then heated to 500° C. with a 2 h ramp time, 16 h hold, and then 2 h return to 25° C. to produce 500C—$Na_2FeS_2$.

X-ray diffraction (XRD)—X-ray diffraction patterns were collected using a Rigaku MiniFlex diffractometer at a scan speed of 5° $min^{-1}$. All samples were measured using a silicon zero-background plate and air sensitive samples were protected by a thick Kapton film during measurement.

Raman—Raman spectra were collected using a Renishaw inVia Raman microscope with 633 nm laser excitation, 20× objective lens, 10 s exposure time, 10 accumulations, and 5% laser power. To prevent air exposure, all samples were pressed into a shallow acrylic well coated with Kapton tape, then covered with a 200 μm thick borosilicate microscope coverslip which was then sealed around the edges. The laser passes through the coverslip to the sample.

Inductively coupled plasma—optical emission spectroscopy (ICP-OES)—Within an Ar-filled glovebox, small samples (~10 mg) of chem-$Na_2FeS_2$ and 500C—$Na_2FeS_2$ were weighed into plastic weigh boats. These were brought out of the glovebox and quickly charged with 5% vol nitric acid in water which dissolves both samples. Each solution was then serially diluted until the nominal Na and Fe content would fall between the prepared standards, which consisted of five concentrations of Na and Fe ranging from 0.1 mg/L to 10 mg/L in addition to a blank, in 5% nitric acid solution. Na and Fe concentrations were measured using an Agilent 5900 ICP-OES. Three wavelengths were used to measure iron (234.350 nm, 238.204 nm, and 259.940 nm) and two wavelengths were used to measure sodium (588.995 nm and 589.592 nm) to prevent any potential spectral interferences. At each wavelength the calibration curves returned an R2 value >0.9999. Additional instrument operating parameters are reported elsewhere.[28]

Scanning electron microscopy—energy dispersive X-ray spectroscopy (SEM-EDS)—Within an Ar-filled glovebox, a small amount of material ($FeS_2$, chem-$Na_2FeS_2$) was placed on adhesive carbon tape on SEM stubs. These stubs were attached to a sample stage holder, after which the whole assembly was sealed within a Teflon-tape+parafilm sealed glass container for transport to the microscope. The sample stage was transferred into the SEM chamber and pumped under vacuum as fast as possible, but some exposure to air was unavoidable. The microscope (Zeiss Gemini 560 FE-SEM) was operated in InLens mode with a voltage of 10 keV and working distance of 8 mm. An Oxford Instruments X-max$^N$ EDS detector paired with Aztec software collected and processed the elemental distribution maps.

Electrochemical characterization—Chem-$Na_2FeS_2$, 500C—$Na_2FeS_2$, and $FeS_2$ containing electrodes were prepared as previously described. Briefly, 6 mg of active material, 2 mg conductive carbon (Super P, 99%, Alfa Aesar), and 2 mg PTFE powder (1 micron, Aldrich) were ground together in a mortar and pestle, measured onto a ½" diameter Ni foam current collector (MTI corp., bcnf-16m), then clamped in a die press.

All experiments were conducted in 2032 coin cells (MTI corp.) using a pre-conditioned (described below) Na metal (MTI corp., 99.7%, 15.6 mm diameter, 0.45 mm thick) or hard carbon (HC, MTI corp., bcaf-BHCss) counter+quasi-reference electrode and the as-described chem-$Na_2FeS_2$ or 500C—$Na_2FeS_2$ working electrode. The separator stack consisted of a ¾" diameter Whatman glass fiber sandwiched between two ¾" Celgard 2500 polypropylene sheets+150 μL of 1 M $NaPF_6$ in 1:1:1 ethylene carbonate:dimethyl carbonate:ethyl methyl carbonate with 1% fluoroethylene carbonate (MTI, SBE-EDE111FEC). Assembled cells were rested 1 h prior to experiment. Cyclic voltammetry was conducted using an 8-channel Biologic VMP-3e potentiostat or a Gamry Reference 620 potentiostat with a scan rate of 0.1 mV $s^{-1}$. Galvanostatic experiments were conducted using a Biologic VMP-3e at 0.05 C (with respect to theoretical 323 mAh/g for $Na_2FeS_2$) using voltage operating windows of 1.3-3.2 V vs $Na/Na^+$.

Pre-conditioning of Na and hard carbon counter electrodes—When paired against fresh Na metal counter electrodes, nearly every $Na_2FeS_2$ cell experienced short-circuiting when the Na was removed from the working electrode and plated onto the counter/reference. Fresh HC electrodes behaved better, but exhibited a first cycle drop in reversible capacity attributed to some degree of Na-trapping (data not shown). To avoid both phenomena, Na metal||HC cells (using one ¾" diameter Whatman glass fiber separator and 50 μL of electrolyte) were assembled and cycled to condition both electrodes. The galvanostatic conditioning protocol is shown in FIG. 14. After conditioning, the coin cells are brought back into the Ar-filled glovebox, opened, and the Na metal and HC electrodes are both harvested and used immediately in $Na_2FeS_2$ cells as described above. While electrochemical cells used for experiments primarily use Na metal electrodes, FIG. 15 shows overlaid chem-$Na_2FeS_2$ vs pre-conditioned Na and HC where the HC cell exhibits identical behavior but shifted ~200 mV vs the Na counter cell.

X-ray emission spectroscopy (XES)—Sulfur Kα X-ray emission spectra were obtained using an easyXAFS BRIMSTONE with an air-cooled X-ray tube operating at 30 kV and 1 mA. The energy was calibrated using a ZnS standard (Kα1=2307.69).[29] $FeS_2$ and FeS powders were pressed into acrylic wells for XES analysis. Electrodes of chem-$Na_2FeS_2$ and D-chem-$Na_2FeS_2$ were encapsulated in gold-coated Kapton film to prevent degradation while still maximizing signal strength. One hundred consecutive spectra were averaged for each sample.

X-ray absorption near-edge spectroscopy (XANES)—Iron (K-edge) X-ray absorption near-edge spectroscopy (XANES) spectra were measured using an easyXAFS 300+ operating at 30 kV and 12 mA. The beam energy was monochromated using a Si (531) spherically bent crystal analyzer (SBCA) and calibrated to the maximum of the first derivative of an Fe foil standard ($E_0$=7112 eV). Five consecutive scans were averaged for each sample. To satisfy the necessary experimental conditions of XANES analysis (high material loading, ~25 mg active material), D-chem-$Na_2FeS_2$ was produced by pressing a ½" diameter freestanding electrode consisting of chem-$Na_2FeS_2$, Super P conductive carbon, and polyethylene powder (12 μm), which was then desodiated using linear scan voltammetry to 3.1 V vs Na metal followed by a 3.1 V potentiostatic hold for a total capacity of ~295 mAh $g^{-1}$. To facilitate sample recovery this desodiation was carried out in a Swagelok-type cell within the Ar-filled glovebox. Both chem-$Na_2FeS_2$ and D-chem-$Na_2FeS_2$ were mixed with additional polyethylene powder (1:6 active material:polymer ratio), pressed into a pellet, sealed within a battery pouch-cell casing, and analyzed.

Many modifications and variations are possible in light of the above teachings. It is therefore to be understood that the claimed subject matter may be practiced otherwise than as specifically described. Any reference to claim elements in the singular, e.g., using the articles “a”, “an”, “the”, or “said” is not construed as limiting the element to the singular.

REFERENCES

1 M. Li, J. Lu, Z. Chen and K. Amine, *Advanced Materials,* 2018, 30, 1800561.

2 A. Manthiram, J. C. Knight, S. T. Myung, S. M. Oh and Y. K. Sun, *Advanced Energy Materials,* 2015, 6, 1501010.

3 B. Li and D. Xia, *Advanced Materials,* 2017, 29, 1701054.

4 G. Assat and J.-M. Tarascon, *Nature Energy,* 2018, 3, 373-386.

5 Y. Y. Hwang, J. H. Han, S. H. Park, J. E. Jung, N. K. Lee and Y. J. Lee, *Nanotechnology,* 2022, 33, 182003.

6 J. J. Zak, S. S. Kim, F. A. L. Laskowski and K. A. See, *Journal of the American Chemical Society,* 2022, 144, 10119-10132.

7 J. He, A. Bhargav, J. Okasinski and A. Manthiram, *Advanced Materials,* 2024, 36, 2403521.

8 S. Saha, G. Assat, M. T. Sougrati, D. Foix, H. Li, J. Vergnet, S. Turi, Y. Ha, W. Yang, J. Cabana, G. Rousse, A. M. Abakumov and J.-M. Tarascon, *Nature Energy,* 2019, 4, 977-987.

9 C. J. Hansen, J. J. Zak, A. J. Martinolich, J. S. Ko, N. H. Bashian, F. Kaboudvand, A. Van der Ven, B. C. Melot, J. Nelson Weker and K. A. See, *Journal of the American Chemical Society,* 2020, 142, 6737-6749.

10 J. Barker and E. Kendrick, *Journal of Power Sources,* 2011, 196, 6960-6963.

11 S. G. Booth, A. J. Nedoma, N. N. Anthonisamy, P. J. Baker, R. Boston, H. Bronstein, S. J. Clarke, E. J. Cussen, V. Daramalla, M. De Volder, S. E. Dutton, V. Falkowski, N. A. Fleck, H. S. Geddes, N. Gollapally, A. L. Goodwin, J. M. Griffin, A. R. Haworth, M. A. Hayward, S. Hull, B. J. Inkson, B. J. Johnston, Z. Lu, J. L. MacManus-Driscoll, X. Martínez De Irujo Labalde, I. McClelland, K. McCombie, B. Murdock, D. Nayak, S. Park, G. E. Pérez, C. J. Pickard, L. F. J. Piper, H. Y. Playford, S. Price, D. O. Scanlon, J. C. Stallard, N. Tapia-Ruiz, A. R. West, L. Wheatcroft, M. Wilson, L. Zhang, X. Zhi, B. Zhu and S. A. Cussen, *APL Materials,* 2021, 9, 109201.

12 R. J. Batchelor, F. W. Einstein, C. H. Jones, R. Fong and J. R. Dahn, *Physical Review B: Condensed Matter and Materials Physics,* 1988, 37, 3699-3702.

13 A. Dugast, R. Brec, G. Ouvrard and J. Rouxel, *Solid State Ionics,* 1981, 5, 375-378.

14 R. Fong, J. R. Dahn and C. H. W. Jones, *Journal of The Electrochemical Society,* 1989, 136, 3206-3210.

15 J. Zou, J. Zhao, B. Wang, S. Chen, P. Chen, Q. Ran, L. Li, X. Wang, J. Yao, H. Li, J. Huang, X. Niu and L. Wang, *ACS Applied Materials & Interfaces,* 2020, 12, 44850-44857.

16 D. W. Murphy and P. A. Christian, *Science,* 1979, 205, 651-656.

17 Y.-S. Su and J.-K. Chang, *Batteries,* 2022, 8, 99.

18 R. Inoue, M. Yamaguchi, Y. Murakami, K. Okano and A. Mori, *ACS Omega,* 2018, 3, 12703-12706.
19 X. Zhu, Z. Su, C. Wu, H. Cong, X. Ai, H. Yang and J. Qian, *Nano Letters,* 2022, 22, 2956-2963.
20 C. Wu, J. Hu, H. Chen, C. Zhang, M. Xu, L. Zhuang, X. Ai and J. Qian, *Energy Storage Materials,* 2023, 60, 102803.
21 H. Zhang, H. Wu, L. Wang, H. Xu and X. He, *Journal of Power Sources,* 2021, 492, 229661.
22 R. A. Sharma, *Journal of The Electrochemical Society,* 1976, 123, 448-453.
23 B. Wang, I. Braems, S. Sasaki, F. Guegan, L. Cario, S. Jobic and G. Frapper, *Journal of Physical Chemistry Letters,* 2020, 11, 8861-8866.
24 L. Yu, X. Zhou, L. Lu, X. Wu and F. Wang, *ChemSusChem,* 2020, 13, 5361-5407.
25 Y. Sun, N. Liu and Y. Cui, *Nature Energy,* 2016, 1, 16071.
26 S. S. Kim, D. N. Agyeman-Budu, J. J. Zak, A. Dawson, Q. Yan, M. Ciban-Acevedo, K. M. Wiaderek, A. A. Yakovenko, Y. Yao, A. Irshad, S. R. Narayan, J. Luo, J. Nelson Weker, S. H. Tolbert and K. A. See, *Chemistry of Materials,* 2022, 34, 3236-3245.
27 R. S. Ruoff, K. M. Kadish, P. Boulas and E. C. M. Chen, *Journal of Physical Chemistry,* 2002, 99, 8843-8850.
28 Deblock, R. H.; Ford, H. O.; Tighe, M. E.; Rolison, D. R.; Long, J. W. An alternate synthetic pathway to nanoscopic $Li_2FeS_2$ for energy storage. *Chem Commun* 2024, 60, 15004-15006.
29 Mori, R. A.; Paris, E.; Giuli, G.; Eeckhout, S. G.; Kavcic, M.; Zitnik, M.; Bucar, K.; Pettersson, L. G. M.; Glatzel, P. Electronic Structure of Sulfur Studied by X-ray Absorption and Emission Spectroscopy. *Anal Chem* 2009, 81, 6516-6525.
30 Hu, Z.; Zhu, Z. Q.; Cheng, F. Y.; Zhang, K.; Wang, J. B.; Chen, C. C.; Chen, J. Pyrite $FeS_2$ for high-rate and long-life rechargeable sodium batteries. *Energy & Environmental Science* 2015, 8, 1309-1316.
31 Nasu, A.; Sakuda, A.; Kimura, T.; Deguchi, M.; Tsuchimoto, A.; Okubo, M.; Yamada, A.; Tatsumisago, M.; Hayashi, A. Iron Sulfide $Na_2FeS_2$ as Positive Electrode Material with High Capacity and Reversibility Derived from Anion-Cation Redox in All-Solid-State Sodium Batteries. *Small* 2022, 18.
32 Jing, P.; Wang, Q.; Wang, B. Y.; Gao, X.; Zhang, Y.; Wu, H. Encapsulating yolk-shell FeS@carbon microboxes into interconnected graphene framework for ultrafast lithium/sodium storage. *Carbon* 2020, 159, 366-377.
33 Lu, Z. X.; Wang, W. X.; Zhou, J.; Bai, Z. C. FeS@C nanorods embedded in three-dimensional graphene as high-performance anode for sodium-ion batteries. *Front Mater Sci* 2020, 14, 255-265.
34 Chen, C. M.; Yang, Y. C.; Tang, X.; Qiu, R. H.; Wang, S. Y.; Cao, G. Z.; Zhang, M. Graphene-Encapsulated FeS in Carbon Fibers as High Reversible Anodes for Na/K Batteries in a Wide Temperature Range. *Small* 2019, 15.
35 Hu, Z. L.; Cui, H. Q.; Zhu, Y. R.; Lei, G. T.; Li, Z. H. Holey reduced graphene oxide nanosheets wrapped hollow FeS@C spheres as a high-performance anode material for sodium-ion batteries. *Journal of Power Sources* 2022, 536.
36 Shadike, Z.; Zhou, Y. N.; Ding, F.; Sang, L.; Nam, K. W.; Yang, X. Q.; Fu, Z. W. The new electrochemical reaction mechanism of Na/FeS cell at ambient temperature. *Journal of Power Sources* 2014, 260, 72-76.
37 Zhao, W. X.; Zhou, Y. B.; Zhou, H.; Wang, X. Q.; Sun, S. J.; He, X.; Luo, Y. S.; Ying, B. W.; Yao, Y. C.; Ma, X. Q.; Sun, X. P. Optimizing Reversible Phase-Transformation of $FeS_2$ Anode via Atomic-Interface Engineering Toward Fast-Charging Sodium Storage: Theoretical Predication and Experimental Validation. *Adv Sci* 2025, 12.
38 Wu, X. L.; Zhao, H. Q.; Xu, J. M.; Wang, Y.; Dai, S. G.; Xu, T. T.; Liu, S. M.; Zhang, S.; Wang, X. C.; Li, X. J. Rational synthesis of marcacite FeS hollow microspheres for high-rate and long-life sodium ion battery anode. *J Alloy Compd* 2020, 825.
39 Yao, Q. Q.; Zhang, J. S.; Shi, X. L.; Deng, B. L.; Hou, K.; Zhao, Y.; Guan, L. H. Rational synthesis of two-dimensional G@porous FeS@C composite as high-rate anode materials for sodium/potassium ion batteries. *Electrochim Acta* 2019, 307, 118-128.
40 Li, Z. H.; Zhang, Y. C.; Li, X. K.; Gu, F. C.; Zhang, L. Q.; Liu, H. J.; Xia, Q. T.; Li, Q. H.; Ye, W. N.; Ge, C.; Li, H. S.; Hu, H.; Li, S. D.; Long, Y. Z.; Yan, S. S.; Miao, G. X.; Li, Q. Reacquainting the Electrochemical Conversion Mechanism of $FeS_2$ Sodium-Ion Batteries by Operando Magnetometry. *J Am Chem Soc* 2021, 143, 12800-12808.
41 Hu, R. D.; Zhao, H. A.; Zhang, J. L.; Liang, Q. H.; Wang, Y. N.; Guo, B. L.; Dangol, R.; Zheng, Y.; Yan, Q. Y.; Zhu, J. W. Scalable synthesis of a foam-like $FeS_2$ nanostructure by a solution combustion-sulfurization process for high-capacity sodium-ion batteries. *Nanoscale* 2019, 11, 178-184.
42 Ding, Y.; Zeng, P. Y.; Fang, Z. Spindle-shaped FeS enwrapped with N/S Co-doped carbon for high-rate sodium storage. *Journal of Power Sources* 2020, 450.
43 Qi, S. H.; Mi, L. W.; Song, K. M.; Yang, K. W.; Ma, J. M.; Feng, X. M.; Zhang, J. M.; Chen, W. H. Understanding Shuttling Effect in Sodium Ion Batteries for the Solution of Capacity Fading: FeS as an Example. *J Phys Chem C* 2019, 123, 2775-2782.

What is claimed is:

1. A method comprising:

providing a polyaromatic hydrocarbon-M adduct solution;

wherein M is lithium or sodium; and reacting the adduct with a sulfide compound having the formula $Ni_xFe_{1-x}S_2$ to form a product having the formula $M_yNi_xFe_{1-x}S_2$;

wherein x is at least 0 and less than 1; and wherein y is a positive number of at most 2.

2. The method of claim 1, wherein the sulfide compound is $FeS_2$.

3. The method of claim 2;

wherein the iron sulfide is in the form of a coating on a substrate; and wherein reacting the benzophenone-lithium adduct with the iron sulfide comprises adding the substrate to the benzophenone-lithium adduct solution.

4. The method of claim 3, wherein the substrate is a carbon substrate.

5. The method of claim 4, wherein the carbon substrate is a carbon fiber.

6. The method of claim 4, wherein the carbon substrate is a carbon paper comprising pores and having the iron sulfide deposited within the pores.

7. The method of claim 3, wherein the substrate is a metal substrate.

8. The method of claim 2, wherein the product is $Li_yFeS_2$ having a particle size of less than 1 μm.

9. The method of claim 2, wherein the product is $Li_yFeS_2$ having a particle size of less than 10 nm.

10. The method of claim 1, further comprising:

providing a benzophenone solution;

adding lithium metal or sodium metal to the benzophenone solution to form a benzophenone-M adduct solution;

wherein the benzophenone-M adduct is $[(C_6H_5)_2CO]\cdot M^+$.

11. The method of claim 10, wherein the benzophenone solution comprises diethylene glycol dimethyl ether.

12. The method of claim 10, wherein up to 2 mol of the lithium metal per 1 mol of the benzophenone is added to the benzophenone solution.

13. The method of claim 1, wherein the polyaromatic hydrocarbon is benzophenone.

* * * * *